(12) United States Patent
Flake et al.

(10) Patent No.: US 8,473,387 B2
(45) Date of Patent: Jun. 25, 2013

(54) FACILITATING COMPENSATION ARRANGEMENTS BETWEEN DATA PROVIDERS AND DATA CONSUMERS

(75) Inventors: Gary W. Flake, Bellevue, WA (US); Royce A. Levien, Lexington, MA (US); Robert W. Lord, Seattle, WA (US); William Henry Mangione-Smith, Kirkland, WA (US); Richard F. Rashid, Redmond, WA (US); Clarence T. Tegreene, Bellevue, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 880 days.

(21) Appl. No.: 12/221,203

(22) Filed: Jul. 30, 2008

(65) Prior Publication Data

US 2009/0327041 A1 Dec. 31, 2009

Related U.S. Application Data

(63) Continuation-in-part of application No. 12/217,138, filed on Jun. 30, 2008, and a continuation-in-part of application No. 12/220,918, filed on Jul. 28, 2008.

(51) Int. Cl.
*G06Q 40/00* (2012.01)
(52) U.S. Cl.
USPC ............... 705/35; 705/34; 709/224; 707/758
(58) Field of Classification Search
USPC ............ 705/34; 709/224; 711/167; 707/758, 707/740
See application file for complete search history.

(56) References Cited

U.S. PATENT DOCUMENTS

| | | | |
|---|---|---|---|
| 4,870,591 A | 9/1989 | Cicciarelli et al. | |
| 4,961,224 A | 10/1990 | Yung | |
| 4,962,532 A | 10/1990 | Kasiraj et al. | |
| 5,768,521 A * | 6/1998 | Dedrick ........................ | 709/224 |
| 5,884,270 A | 3/1999 | Walker et al. | |
| 6,061,692 A | 5/2000 | Thomas et al. | |
| 6,061,789 A | 5/2000 | Hauser et al. | |
| 6,338,050 B1 | 1/2002 | Conklin et al. | |
| 6,735,601 B1 | 5/2004 | Subrahmanyam | |
| 6,886,000 B1 | 4/2005 | Aggarwal et al. | |
| 6,961,562 B2 | 11/2005 | Ross | |
| 7,269,664 B2 | 9/2007 | Hutsch et al. | |
| 7,801,905 B1 * | 9/2010 | Singh et al. ................... | 707/758 |
| 7,835,943 B2 | 11/2010 | Cheung et al. | |
| 7,941,436 B2 | 5/2011 | Popescul et al. | |
| 2001/0032210 A1 | 10/2001 | Frank et al. | |
| 2001/0049681 A1 | 12/2001 | Bova | |
| 2001/0051940 A1 | 12/2001 | Soulanille | |
| 2001/0052761 A1 | 12/2001 | Taniguchi et al. | |

(Continued)

OTHER PUBLICATIONS

Zaihan Yang and Chengfei Liu, Implementing a Flexible Compensation Mechanism for Business Processes in Web Service Environment, IEEE International Conference on Web Services (ICWS'06)—Jan. 2006.

(Continued)

*Primary Examiner* — Samica L Norman

(57) ABSTRACT

Systems and methods for data brokering, and more specifically, data brokering regarding a data provider's search-related activities are described. In particular implementations, various aspects of facilitating a compensation arrangement between a data provider and a data consumer regarding one or more data-provider-related search activities, are described.

60 Claims, 15 Drawing Sheets

U.S. PATENT DOCUMENTS

| | | | |
|---|---|---|---|
| 2002/0004727 | A1 | 1/2002 | Knaus et al. |
| 2002/0010679 | A1 | 1/2002 | Felsher |
| 2002/0099605 | A1 | 7/2002 | Weitzman et al. |
| 2002/0143596 | A1 | 10/2002 | Carmody |
| 2003/0033161 | A1 | 2/2003 | Walker et al. |
| 2003/0163416 | A1 | 8/2003 | Kitajima |
| 2003/0220844 | A1 | 11/2003 | Marnellos et al. |
| 2003/0225989 | A1* | 12/2003 | Licalsi .................. 711/167 |
| 2004/0068460 | A1 | 4/2004 | Feeley et al. |
| 2004/0073570 | A1 | 4/2004 | Janakiraman et al. |
| 2004/0167845 | A1 | 8/2004 | Corn et al. |
| 2005/0021359 | A1 | 1/2005 | McKinney |
| 2005/0097024 | A1 | 5/2005 | Rainey |
| 2005/0197972 | A1 | 9/2005 | Kettner et al. |
| 2006/0155842 | A1 | 7/2006 | Yeung et al. |
| 2007/0130005 | A1 | 6/2007 | Jaschke |
| 2007/0258460 | A1 | 11/2007 | Momtahan et al. |
| 2008/0120162 | A1 | 5/2008 | Carmody |
| 2008/0215493 | A1 | 9/2008 | Ong et al. |
| 2008/0228403 | A1 | 9/2008 | Robertsson |
| 2009/0106084 | A1 | 4/2009 | Or |
| 2010/0211490 | A1* | 8/2010 | Itoh et al. .................. 705/34 |
| 2010/0250547 | A1* | 9/2010 | Grefenstette et al. ......... 707/740 |
| 2011/0276452 | A1 | 11/2011 | Stephens |

OTHER PUBLICATIONS

Palamida, Security Implications of Web 2.0 Services, www.palamida.com—Mar. 2008.

Cisco, Web 2.0 in the Enterprise Cisco IT helps to build a scalable, secure communications and collaboration platform, Cisco on Cisco: Inside Cisco IT Trends in IT—Mar. 2008.

Claye Stokes, Small Business Web Design Guide—Part I, www.clayestokes.com—Jul. 16, 2008.

Dustin Whittle, Yahoo, Web 2.0 Expo—printed on Nov. 19, 2008.

Jesse James Garrett, Ajax: A New Approach to Web Applications Recent, http://adaptivepath.com/ideas/essays/archives/000385.php—Feb. 18, 2005.

William White, RIA Applications and the Web Presentation, Yahoo! Media Innovation Group—printed on Nov. 19, 2008.

Philip McCarthy, Software development consultant, Independent, Ajax for Java developers: Build dynamic Java applications, http://www-128.ibm.com/developerworks/library/j-ajax1—Sep. 20, 2005.

Dion Hinchcliffe, Building Next Generation Web 2.0 Applications, www.web20university.com—Apr. 2008.

James Snell, Call Soap Web Services with Ajax Part 1: Build the Web Services Client, http://www-128.ibm.com/developerworks/webservices/library/ws-wsajax—Sep. 18, 2008.

Paul Hammond and Simon Wilson, d.Construct 2006, http://www.paulhammond.org/2006/dconstruct—Sep. 8, 2006.

Steven Webster, Macromedia Flash MX Professional 2004, http://store2.adobe.com/devnet/flash/articles/ria_dataservices.html—Sep. 18, 2008.

Aral Balkan, Mash my Flex up, aralbalkan.com—printed on Nov. 19, 2008.

O'Reilly Media Inc., Mastering Ajax, Part 1: Introduction to Ajax, http://www.ibm.com/developerworks/web/library/wa-ajaxintro1.html—Dec. 6, 2005.

O'Reilly Media Inc., Mastering Ajax, Part 2: Make asynchronous requests with JavaScript and Ajax, http://www-128.ibm.com/developerworks/java/library/wa-ajaxintro2/index.html—Jan. 17, 2006.

Jesse James Garrett, OK/Cancel, http://www.ok-cancel.com/archives/article/2005/09/why-ajax-matters-now.html—Sep. 16, 2005.

Tim O'Reilly, What is Web 2.0, http://r2computing.blogspot.com/2008/04/web-20-democracy-of-ideas.html—Sep. 30, 2005.

O'Reilly Media, Spreading the knowledge of innovators—printed on Nov. 19, 2008.

Satayam, Service-Oriented Architecture (SOA)—2008.

Karl Bishop and Doug Phillips, Using Ajax with WebSphere Portal, http://www.ibm.com/developerworks/websphere/library/techarticles/0606_bishop/0606_bishop.html—Jun. 28, 2006.

0'Reilly Radar, Web 2.0 Principles and Best Practices, Tim O'Reilly, Executive Summary—Fall 2006.

James Snell, Call SOAP Web services with Ajax, Part 1: Build the Web services client, ibm.com/developerWorks—Oct. 11, 2005.

Microsoft Corporation, XML Developer Center, http://msdn.microsoft.com/en-us/xml/default.aspx—printed on Nov. 19, 2008.

Philip McCarthy, Software development consultant, Independent, Ajax for Java developers: Build dynamic Java applications, http://www-128.ibm.com/developerworks/library/j-ajax2—Oct. 4, 2005.

U.S. Appl. No. 12/221,465, Flake et al.

U.S. Appl. No. 12/229,506, Flake et al.

* cited by examiner

FACILITATING COMPENSATION ARRANGEMENTS BETWEEN DATA PROVIDERS AND DATA CONSUMERS

CROSS REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

Related Applications:

For purposes of the United States Patent and Trademark Office (USPTO) extra-statutory requirements (described more fully below), the present application is:

1. For purposes of the USPTO extra-statutory requirements, the present application constitutes a continuation-in-part of U.S. patent application Ser. No. 12/217,138 entitled FACILITATING COMPENSATION ARRANGEMENTS FOR DATA BROKERING filed on Jun. 30, 2008 under Attorney Docket number SE1-0037-US, and naming Gary W. Flake, Royce A. Levien, Robert W. Lord, William Henry Mangione-Smith, Richard F. Rashid, Clarence T. Tegreene, and Lowell L. Wood, Jr. as inventors, which is currently co-pending, or is an application of which a currently co-pending application is entitled to the benefit of the filing date.

2. For purposes of the USPTO extra-statutory requirements, the present application constitutes a continuation-in-part of U.S. patent application Ser. No. 12/220,918 entitled FACILITATING COMPENSATION ARRANGEMENTS PROVIDING FOR DATA TRACKING COMPONENTS filed on Jul. 28, 2008 under naming Gary W. Flake, Royce A. Levien, Robert W. Lord, William Henry Mangione-Smith, Richard F. Rashid, Clarence T. Tegreene, and Lowell L. Wood, Jr. as inventors, which is currently co-pending, or is an application of which a currently co-pending application is entitled to the benefit of the filing date.

The United States Patent and Trademark Office (USPTO) has published a notice to the effect that the USPTO's computer programs require that patent applicants reference both a serial number and indicate whether an application is a continuation or continuation in part. Stephen G. Kunin, *Benefit of Prior-Filed Application*, USPTO Electronic Official Gazette, Mar. 18, 2003. The present applicant entity has provided a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

FIELD OF THE DISCLOSURE

The present disclosure relates generally to data brokering, and more specifically, to facilitating a compensation arrangement between a data provider and a data consumer regarding one or more data-provider-related search activities.

BACKGROUND

Individuals that engage in on-line activities, such as on-line search-related activities, typically generate information that may have value to other entities. Such information has often been surreptitiously monitored and gathered by various interested parties who, in turn, may make use of the information for commercial purposes (e.g. advertising).

SUMMARY

The present disclosure teaches systems and methods for data brokering, and more specifically, data brokering regarding a data provider's search-related activities. In particular implementations, the present disclosure teaches aspects of facilitating a compensation arrangement between a data provider and a data consumer regarding one or more data-provider-related search activities.

DETAILED DESCRIPTION

Techniques for brokering data regarding a data provider's search-related activities are disclosed. It should be appreciated that many specific details of certain implementations are set forth in the following description, and in FIGS. 1 through 15, to provide a thorough understanding of such implementations. One skilled in the art will understand from the teachings of the present disclosure, however, that the present disclosure may have other possible implementations, and that such other implementations may be practiced with/without some of the details set forth in the following description.

In the following discussion, an exemplary environment 100 for implementing one or more of the teachings of the present disclosure is described. Next, an exemplary computing device 200 for implementing one or more of the teachings of the present disclosure is described, followed by a description of various possible implementations of processes for data brokering in accordance with various implementations of the present disclosure.

Exemplary Environment

Figure 1:
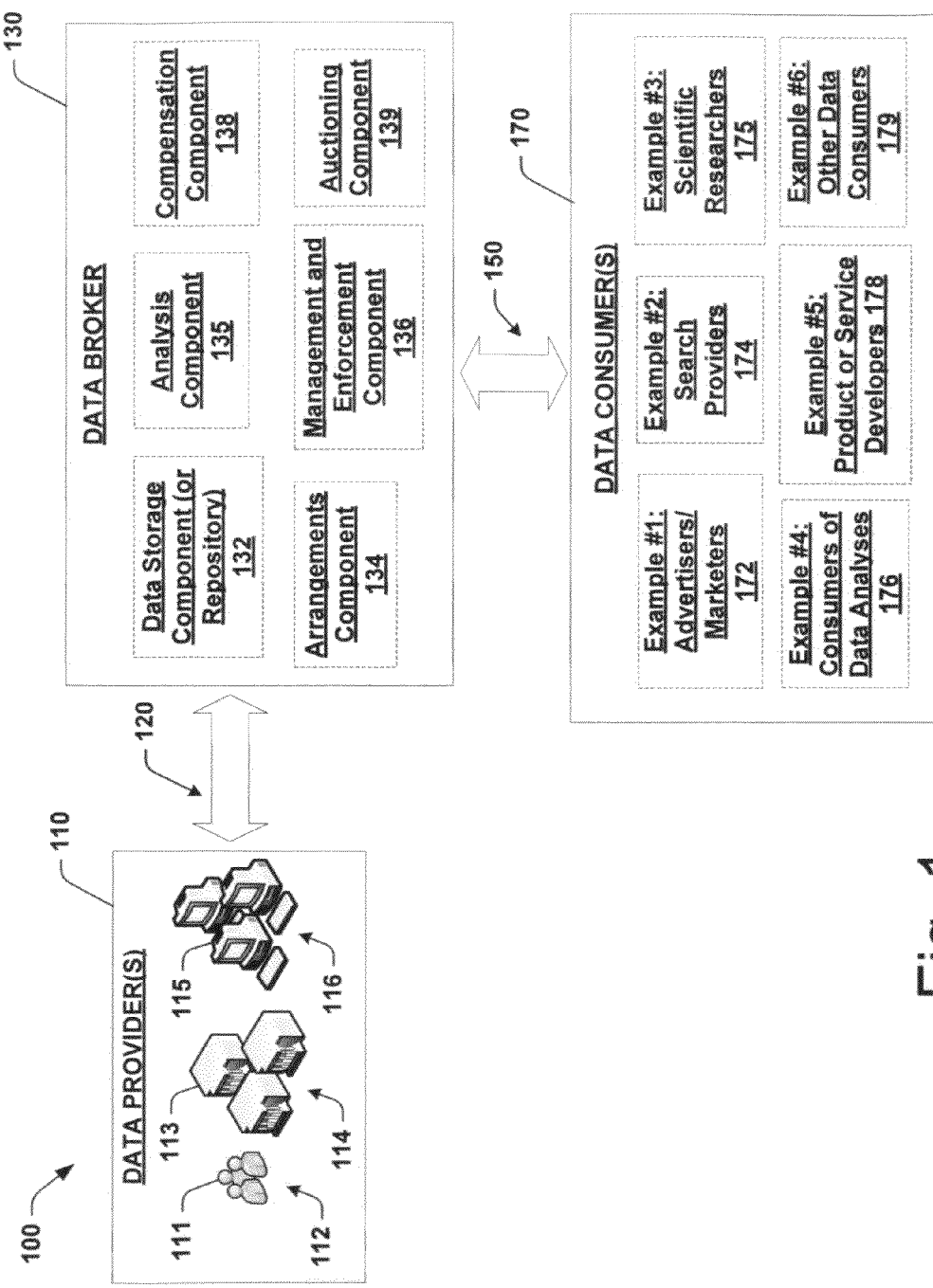
FIG. 1 is a schematic view of a representative environment for brokering data in accordance with an implementation of the present disclosure.

FIG. 1 is a schematic view of a representative environment 100 in accordance with an implementation of the present disclosure. In this implementation, the environment 100 includes one or more data providers 110, and one or more data consumers 170 who use the data generated by the data providers 110. In general, the data (or data products) generated by the data providers 110 may include a wide variety of information, including keywords, phrases, search terms, Universal Resource Locator (URL) data, browsing history, eyeballing history, time and quantity information, selection history, affinity-related information, health-related information, consumer-related information, personal-characteristic information, corporate (or other business entity) information, and any other suitable information.

The data providers 110 may include a variety of different providers and provider types. For example, in various implementations, the data providers 110 may include an individual 111, a group of individuals 112, an entity 113, a group of entities 114, a device 115, or a group of devices 116. In general, virtually any individual, entity, device, or groups thereof, may be a member of the data providers 110. For example, in various implementations, the individual 111 (or group of individuals 112) may include a computer user, consumer, person from a particular demographic group (e.g. age, gender, race, profession, religion, orientation, preference, geographic area, etc.), a particular bellwether or trendsetting individual (e.g. individual with popular ideas or tastes, athlete, performing artist, etc.), or any other suitable person.

Similarly, in various implementations, the entity 113 (or group of entities 114) may include a professional organization (e.g. Institute of Electrical and Electronics Engineers (IEEE), American Automobile Association (AAA), American Association of Retired Persons (AARP), etc.), company, university, union (e.g United Auto Workers (UAW), International Affiliation of Writers Guilds, European Patent Lawyers Association (EPLA), etc.), consumer group (e.g. members of Costco®, Sam's Club®, Starwood®, etc.), club, association, (e.g. Boy Scouts of America, etc.), or any other suitable type of entity. Also, in various implementations, the device 115 (or group of devices 116) may include, for example, a computer, networking device, processor, personal communication device, or any other suitable type of device. Of course, other individuals, entities, and devices that may serve as data providers 110 may be conceived. More specifically, in particular implementations, any individual, entity, or device whose data may serve as an indicator of future consumption may suitably qualify such individual, entity, or device as a data provider 110.

The data consumers 170 may also include a variety of different consumers and consumer types. For example, in some specific implementations, the data consumers 170 may include advertisers or marketers 172, search providers 174, scientific researchers 175, consumers of data analyses 176, product or service developers 178, or any other data consumers 179. Data consumers 170 may also include any and all of the individuals, entities, and devices (or groups thereof) referenced above as data providers 110, or any other suitable types of data consumers. It will be appreciated that the data providers 110 and the data consumers 170 are not necessarily mutually exclusive groups, and that an entity may in some instances be a data provider, and in other instances a data consumer, or may even be both at the same time.

As further shown in FIG. 1, a data broker 130 operatively communicates with the one or more data providers 110 and the one or more data consumers 170. For example, communications (or interactions) 120 may be exchanged between the data broker 130 and the one or more data providers 110. The communications 120 may include, in some implementations, negotiation activities (e.g. offers, rejections, counteroffers, terms, conditions, provisions, etc.) which may lead to the establishment of one or more data provision agreements between the data providers 110 and the data broker 130. The communications 120 may also include communications relating to performance of established data provision agreements, including, for example, data transmissions, data receptions, access records, compensation exchanges, accounting exchanges, or any other suitable communications (or interactions) relating to data brokering.

Such communications 120 may be exchanged via any suitable communications systems. For example, in some implementations the communications 120 may be exchanged via one or more of telephony (e.g. using the public switched telephone system), the internet (e.g., Voice over Internet Protocol), cellular telephone systems, satellite communication systems, instant messaging, text messaging, electronic mail ("email"), facsimiles, written communications, or any other suitable communications systems. Further, the communications 120 may be accomplished using any suitably operable couplings between the data broker 130 and the one or more data providers 110, including physical connections (e.g. wires, cables, fiber-optic lines, etc.), or wireless connections (e.g. radio-frequency connections between cell phone and cell network towers, satellite towers, etc.) and/or some combination of physical connections and wireless connections, and may be accomplished using one or more components of an exemplary computing device, such as a network interface, a wireless interface, a serial port interface, or any other suitable components (e.g. components or interfaces 216, 222, 228, 252, 242, 255 of FIG. 2).

Similarly, communications (or interactions) 150 between the data broker 130 and the one or more data consumers 170 may include, for example, negotiation activities (e.g. offers, rejections, counteroffers, terms, conditions, provisions, etc.) which may lead to the establishment of one or more data use agreements between the data providers 110 and the data broker 130. Also, the communications 150 may include communications relating to performance of established data use agreements, including, for example, data transmissions, data receptions, access records, compensation exchanges, accounting exchanges, or any other suitable communications (or interactions) relating to data brokering.

Again, such communications 150 may be exchanged via any suitable communications systems. For example, in some implementations the communications 150 may be exchanged via one or more of telephony (e.g. using the public switched telephone system), the internet (e.g., Voice over Internet Protocol), cellular telephone systems, satellite communication systems, instant messaging, text messaging, electronic mail ("email"), facsimiles, written communications, or any other suitable communications systems. Further, the communications 150 may be accomplished using any suitably operable couplings between the data broker 130 and the one or more data consumers 170, including physical connections (e.g. wires, cables, fiber-optic lines, etc.), or wireless connections (e.g. radio-frequency connections between cell phone and cell network towers, satellite towers, etc.) and/or some combination of physical connections and wireless connections, and may be accomplished using one or more components of an exemplary computing device, such as a network interface, a wireless interface, a serial port interface, or any other suitable components (e.g. components or interfaces 216, 222, 228, 252, 242, 255 of FIG. 2).

In some implementations, the data broker 130 may include one or more components that are operable to perform various functions and operations associated with the data broker 130. For example, the data broker 130 may include a data storage component 132, an arrangements component 134, an analysis component 135, a management and enforcement component 136, a compensation component 138, and an auctioning component 139. It will be appreciated that the components of the data broker 130 shown in FIG. 1 are merely exemplary, and represent a possible implementation of the data broker 130. The functions and operations of the components 132-139 of the data broker 130 will be described more fully below with reference to FIGS. 3 through 15.

In the implementation shown in FIG. 1, the various components 132-139 of the data broker 130 may communicate and exchange information as needed to perform the functions and operations described herein. In various implementations, each of the components 132-139 may be implemented using software, hardware, firmware, or any suitable combinations thereof. It will be appreciated that in alternate implementations of the data broker 130, one or more of the components 132-139 of the data broker 130 may be combined, or may be divided or separated into additional components, or additional components may be added, or one or more of the components 132-139 may simply be eliminated, depending upon the particular requirements or specifications of the operating environment. An exemplary computing device 200 for carrying out one or more of the functions and operations of the environment 100 is described in the following section.

Exemplary Computing Device

Figure 2:
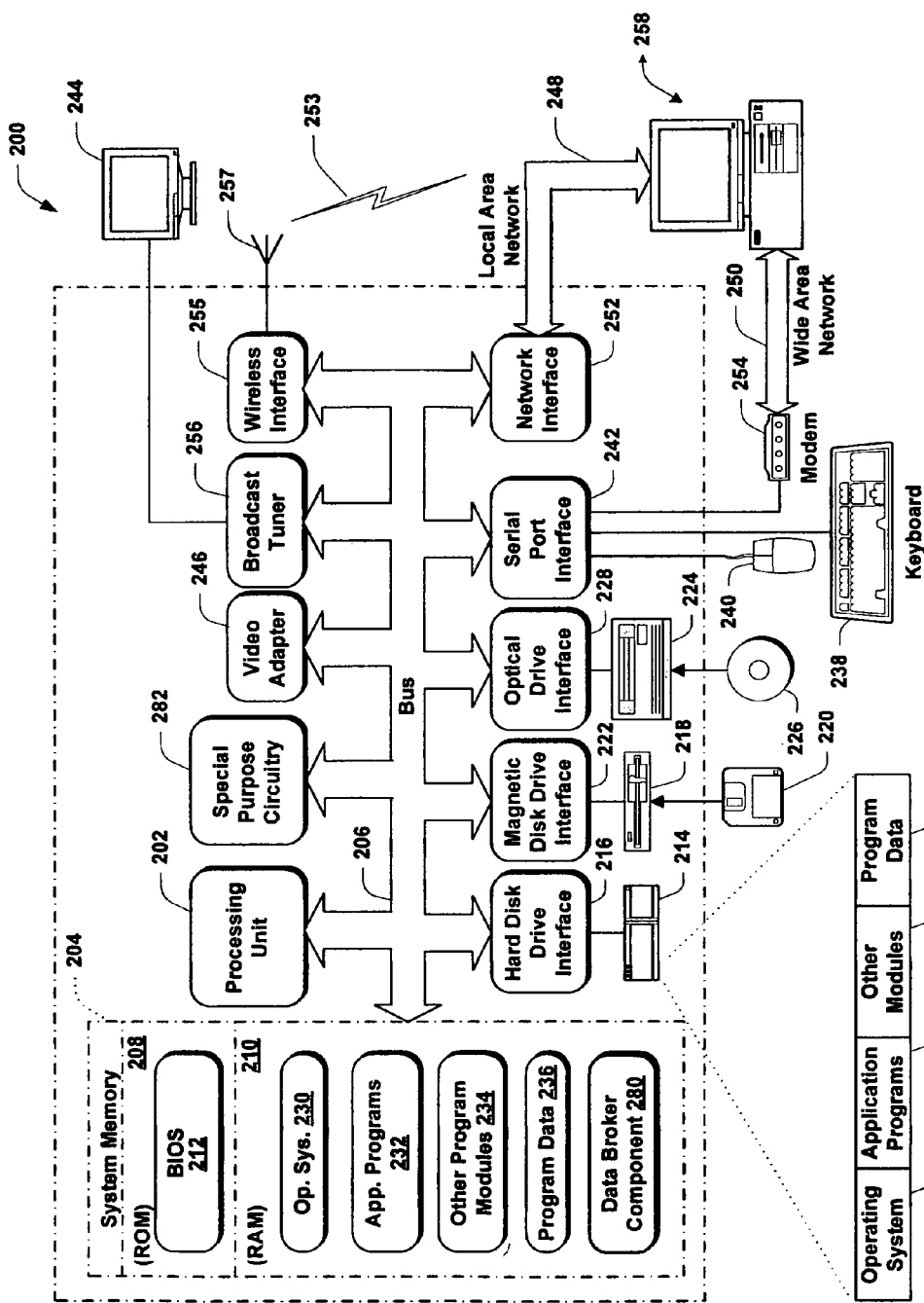
FIG. 2 is a schematic view of an exemplary computing device configured to operate in accordance with another implementation of the present disclosure.

In some implementations, one or more of the components of the exemplary environment 100 shown in FIG. 1 may be at least partially implemented using a computing device. For example, FIG. 2 is a schematic view of an exemplary computing device 200 configured to operate in accordance with an implementation of the present disclosure. As described below, the computing device 200 can be configured to perform one or more of the functions and operations associated with the environment 100 shown in FIG. 1, and more specifically, one or more of the functions and operations associated with the data broker 130, or the one or more components 132-139 of the data broker 130.

As shown in FIG. 2, in some implementations, the computing device 200 may include one or more processors (or processing units) 202, special purpose circuitry 282, a memory 204, and a bus 206 that couples various system components including the memory 204 to the one or more processors 202 and special purpose circuitry 282. The bus 206 represents one or more of any of several types of bus structures, including a memory bus or memory controller, a peripheral bus, an accelerated graphics port, and a processor or local bus using any of a variety of bus architectures. In this implementation, the memory 204 includes read only memory (ROM) 208 and random access memory (RAM) 210. A basic input/output system (BIOS) 212, containing the basic routines that help to transfer information between elements within the computing device 200, such as during start-up, is stored in ROM 208.

The exemplary computing device 200 further includes a hard disk drive 214 for reading from and writing to a hard disk (not shown), and is connected to the bus 206 via a hard disk driver interface 216 (e.g., a SCSI, ATA, or other type of interface). A magnetic disk drive 218 for reading from and writing to a removable magnetic disk 220, is connected to the system bus 206 via a magnetic disk drive interface 222. Similarly, an optical disk drive 224 for reading from or writing to a removable optical disk 226 such as a CD ROM, DVD, or other optical media, connected to the bus 206 via an optical drive interface 228. The drives and their associated computer-readable media provide nonvolatile storage of computer readable instructions, data structures, program modules and other data for the computing device 200. Although the exemplary computing device 200 described herein employs a hard disk, a removable magnetic disk 220 and a removable optical disk 226, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

As further shown in FIG. 2, a number of program modules may be stored on the memory 204 (e.g. the ROM 208 or the RAM 210) including an operating system 230, one or more application programs 232, other program modules 234, and program data 236. Alternately, these program modules may be stored on other computer-readable media, including the hard disk, the magnetic disk 220, or the optical disk 226. For purposes of illustration, programs and other executable program components, such as the operating system 230, are illustrated in FIG. 2 as discrete blocks, although it is recognized that such programs and components reside at various times in different storage components of the computing device 200, and may be executed by the processor(s) 202 or the special purpose circuitry 282 of the computing device 200.

A user may enter commands and information into the computing device 200 through input devices such as a keyboard 238 and a pointing device 240. Other input devices (not shown) may include a microphone, joystick, game pad, satellite dish, scanner, or the like. These and other input devices are connected to the processing unit 202 and special purpose circuitry 282 through an interface 242 that is coupled to the system bus 206. A monitor 244 or other type of display device is also connected to the bus 206 via an interface, such as a video adapter 246. In addition to the monitor, the computing device 200 may also include other peripheral output devices (not shown) such as speakers and printers.

The computing device 200 may operate in a networked environment using logical connections to one or more remote computers (or servers) 258, such as those operated by one or more of the data providers 110 and data consumers 170 shown in FIG. 1. Such remote computers (or servers) 258 may be a personal computer, a server, a router, a network PC, a peer device or other common network node, and may include many or all of the elements described above relative to computing device 200. The logical connections depicted in FIG. 2 (and in FIG. 1) may include one or more of a local area network (LAN) 248 and a wide area network (WAN) 250. Such networking environments are commonplace in offices, enterprise-wide computer networks, intranets, and the Internet. In this embodiment, the computing device 200 also includes one or more broadcast tuners 256. The broadcast tuner 256 may receive broadcast signals directly (e.g., analog or digital cable transmissions fed directly into the tuner 256) or via a reception device (e.g., via an antenna, a satellite dish, etc.).

When used in a LAN networking environment, the computing device 200 may be connected to the local network 248 through a network interface (or adapter) 252. When used in a WAN networking environment, the computing device 200 typically includes a modem 254 or other means for establishing communications over the wide area network 250, such as the Internet. The modem 254, which may be internal or external, may be connected to the bus 206 via the serial port interface 242. Similarly, the computing device 200 may exchange (send or receive) wireless signals 253 with one or more remote computers (or servers) 258, such as those operated by one or more of the data providers 110 and data consumers 170, using a wireless interface 255 coupled to a wireless communicator 257 (e.g., an antenna, a satellite dish, a transmitter, a receiver, a transceiver, a photoreceptor, a photodiode, an emitter, a receptor, etc.).

In a networked environment (e.g. environment 100 of FIG. 1), program modules depicted relative to the computing device 200, or portions thereof, may be stored in the memory 204, or in a remote memory storage device. More specifically, as further shown in FIG. 2, a data broker component 280 may be stored in the memory 204 of the computing device 200. The data broker component 280 may include an implementation of the data broker 130 of FIG. 1, or one or more components 132-139 of the data broker 130. The data broker component 280 may be implemented using software, hardware, firmware, or any suitable combinations thereof. In cooperation with the other components of the computing device 200, such as the processing unit 202 or the special purpose circuitry 282, the data broker component 280 may be operable to perform one or more implementations of processes for data brokering in accordance with the present disclosure. More specifically, the computing device 200 may be operable to perform one or more implementations of methods of brokering data, as described more fully below.

Exemplary Processes for Data Brokering

Exemplary processes for brokering data regarding a data provider's search-related activities will now be described. For convenience, and to facilitate an understanding of these processes, the exemplary processes will be described with reference to the exemplary environment 100 and exemplary computing device 200 described above.

As noted above, the data broker 130 (FIG. 1) may include one or more components that are operable to perform various functions and operations associated with the data broker 130. More specifically, in the exemplary implementation of the data broker 130 shown in FIG. 1, the data broker 130 includes a data storage component or repository 132, an arrangements component 134, an analysis component 135, a management and enforcement component 136, a compensation component 138, and an auctioning component 139. Of course, in alternate implementations, one or more of these components 132-139 may be combined, separated into additional components, or eliminated, or additional components may be added, depending upon the particular requirements or specifications of the operating environment.

Various exemplary functionalities of the components 132-139 of the exemplary data broker 130 will now be described. It should be appreciated that the exemplary functionalities described below may be desirable in some implementations but not in others, and that unless otherwise specified, such exemplary functionalities are non-essential, and may be varied or omitted depending upon the desired operating characteristics of the implementation, or the particular requirements or specifications of the operating environment.

In some implementations, the data storage component 132 may be operable to receive and store data provided by the data providers 110. The data storage component 132 may organize the data by type, profile, data provider, value, or using any other suitable organizational structure. In some implementations, the data storage component 132 may perform verification activities, including monitoring and analyzing incoming data to ensure verity (e.g. accuracy, authenticity, etc.) of the information provided by the data providers 110.

In some implementations, the data provided by the data providers 110 may be included as part of the communications 120 described above. Furthermore, the data provided by the data providers 110 may be provided in any suitable form, including electrical signals, optical signals, acoustic signals, electromagnetic signals, modulated signals (e.g. frequency or amplitude modulated signals, etc.), binary signals, tabulated data, data records, data summaries, or any other suitable forms, and may be provided using any suitable communication media, including physical media (e.g. wires, cables, optical connectors, CD's, DVD's, printed or written data, etc.) non-physical transmission media (e.g. wireless transmissions), or any other suitable communication systems or methods.

In some implementations, the data storage component 132 may store additional information relating to the communications 120, 150 between the data broker 130 and the data providers 110 and the data consumers 170. For example, the data storage component 132 may store information relating to the functions and operations of any of the other components 134-139 of the data broker 130, including, for example, negotiation activities (e.g. offers, rejections, counteroffers, terms, conditions, provisions, etc.), established data provision agreements and data use agreements (e.g. terms and conditions regarding access, compensation, privacy, quality, quantity, usage, rights and restrictions, etc.), and information relating to performance of such established agreements (e.g. data transmissions, data receptions, access records, compensation exchanges, accounting exchanges, etc.). Various aspects of possible functions and operations of the other components 134-139 of the data broker 130 that may be stored within the data storage component 132 are described below.

Similarly, the arrangements component 134 may be operable to perform a variety of functions and operations associated with the data broker 130 via the communications 120, 150 between the data broker 130 and the data providers 110 and the data consumers 170. For example, in some implementations, the arrangements component 134 may be operable to perform negotiations of data brokering arrangements, including one or more of data provision agreements with data providers 110, or data use agreements with data consumers 170.

More specifically, in some implementations, the arrangements component 134 may be operable to create proposals, propose terms, receive offers to provide data, receive offers to consume data, receive requests for data analyses, identify potential data providers, identify potential data consumers, and perform other functions and operations associated with making arrangements with the data providers 110, the data consumers 170, or both. Additional aspects of data brokering that may be negotiated or performed by the arrangements component 134 are described below with reference to FIGS. 3 through 11.

The analysis component 135 (FIG. 1) may also be operable to perform a variety of functions and operations associated with the data broker 130. For example, the analysis component 135 may be operable to perform an analysis or simulation using one or more components of the computing device 200 (e.g. the processing unit 202, the special purpose circuitry 282, the memory 204, the application programs 232, the program modules 234, the program data 236, etc.).

More specifically, in some implementations, the analysis component 135 may be operable to perform a desired analysis or simulation in response to a request by one or more of the data consumers 170 (or the data providers 110, or the data broker 130), such as to test a theory, to determine a potential value of data, to develop or validate a new model or hypothesis, to filter or glean relevant data from a quantity of raw data, or to perform any other suitable analysis or simulation. For example, the analysis component 135 may, at the request of one or more of the data consumers 170 (or the data providers 110, or the data broker 130) perform desired analyses or simulations, including mathematical manipulations of the data (e.g. interpolations, extrapolations, correlations, data fitting analyses, linear regressions, mathematical combinations, statistical analyses, Fourier analyses, Bayesian analyses, time-series analyses, etc.), model validation activities, model test activities, model development activities of suitable models (e.g. marketing models, consumption models, business models, economic models, etc.) that may use the data provided by the data providers 110.

The management and enforcement component 136 (FIG. 1) may be operable to monitor a performance of one or more of the data providers 110, the data broker 130, or the data consumers 170, in accordance with the arrangements established by the arrangements component 134. In some implementations, the management and enforcement component 136 may monitor performance by analyzing the communications 120 between the data providers 110 and the data broker 130, or the communications 150 between the data broker 130 and the data consumers 170. In other implementations, the management and enforcement component 136 may monitor the operations of one or more of the other components of the data broker 130 (e.g the data storage component 132, the analysis component 135, the compensation component 138, etc.).

More specifically, the management and enforcement component 136 may perform one or more monitoring functions (e.g. access requests, traffic volumes, access periods, access volumes, consumer and provider identities, hits, usage rates, provision rates, etc.), recordkeeping functions (e.g. access requests, traffic volumes, access periods, access volumes, consumer and provider identities, hits, usage rates, provision rates, etc.), access control functions (e.g. data rights management, license terms, restrictions on usage, privacy and confidentiality provisions, etc.), notification functions including transmitting alerts, warnings, reminders, and notices regarding terms and conditions of data brokering agreements (e.g. usage rates and limits, provision rates and limits, spending rates and limits, quality assurance, usage restrictions, privacy restrictions, etc.), or any other suitable functions in accordance with the terms and conditions of the agreements established between the parties.

The functions and operations of the management and enforcement component 136 may be performed using software (e.g. traffic monitoring software, speed monitoring software, transfer rates recorder, bandwidth usage software, keystroke monitoring, etc.) that monitors, records, or captures upload and download activities (e.g. at one or more interfaces of a computing device 200, at the processor 202, at the memory 204, etc.), hardware (e.g counters, meters, network cards, circuitry, etc.), firmware, or any suitable combination thereof.

With continued reference to FIG. 1, the compensation component 138 may be operable to determine the various amounts of compensation due from one or more of the data consumers 170, or to determine the various amounts of compensation owing to on or more of the data providers 110, or both. For example, the compensation component 138 may be operable to determine compensation due or owing using one or more components of the computing device 200 (e.g the processing unit 202, the special purpose circuitry 282, the memory 204, the application programs 232, the program modules 234, the program data 236, etc.).

In some implementations, the compensation component 138 may receive instructions or information to be used in determining compensation due or owing from one or more other components of the data broker 130. For example, in some implementations, the compensation component 138 may receive terms or instructions regarding compensation established by the arrangements component 134 (or the auctioning component 139). Similarly, the compensation component 138 may receive performance information from one or more other components of the data broker 130, including performance information from the management and enforcement component 136, the data storage component 132, the analysis component 135, or any other suitable component. In further implementations, the compensation component 138 may be operable to manage and implement a variety of compensation types, including upfront compensation, future compensation, contingent or conditional compensation, royalty-based compensation, auctioning-based compensation, non-monetary compensation, or any other suitable types of compensation. The compensation determined by the compensation component 138 may be provided by one or more of the communications 120 between the data providers 110 and the data broker 130, or the communications 150 between the data broker 130 and the data consumers 170.

The auctioning component 139 (FIG. 1) may be operable to perform functions and operations associated with the auctioning of data. For example, in some implementations, the auctioning component 139 may function in a manner substantially similar to the arrangements component 134, but may be operable to do so in an auctioning format. The auctioning component 139 may be operable to perform a variety of functions and operations associated with the data broker 130 via the communications 120, 150 between the data broker 130 and the data providers 110 and the data consumers 170. For example, in some implementations, the auctioning component 139 may be operable to perform negotiations of data brokering arrangements, including one or more of arranging or negotiating data provision agreements with data providers 110 via the communications 120, or arranging or negotiating data use agreements with data consumers 170 via the communications 150.

In some implementations, the auctioning component 139 may be operable to offer data products to a plurality of potential data consumers, to receive bids for use of the data, to evaluate the bids, to negotiate the terms and conditions, and to perform any other suitable auction-related functions. The auctioning component 139 may also be configured to create proposals, propose terms, receive offers to provide data, receive offers to consume data, receive requests for data analyses, identify potential data providers, identify potential data consumers, perform negotiations of one or more of data provision agreements and data use agreements, and perform other functions and operations associated with making arrangements with the data providers 110 and the data consumers 170.

Additional aspects of data brokering processes in accordance with various possible implementations of the present disclosure will now be described with reference to FIGS. 3 through 15. For ease of understanding, the flowcharts are organized such that the initial flowchart (FIG. 3) presents an overall "big picture" viewpoint, and thereafter the following flowcharts present possible particular implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and efficient understanding of the various process instances.

Figure 3:
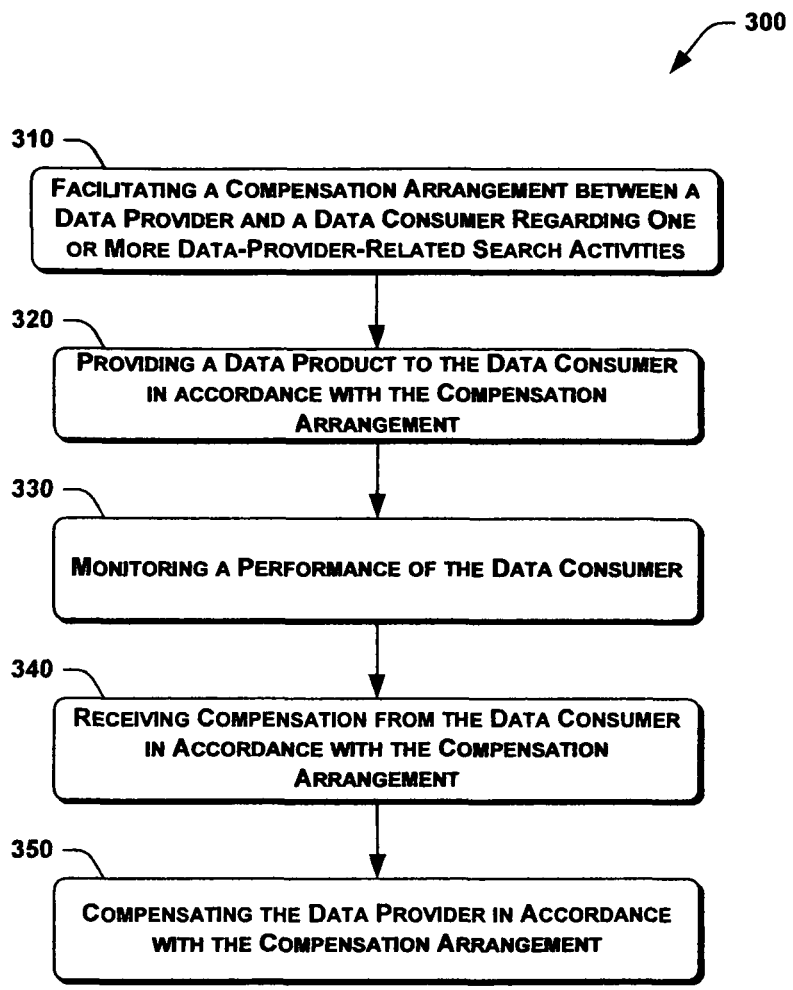
FIG. 3 is a flowchart of a method of brokering data in accordance with another implementation of the present disclosure.

FIG. 3 is a flowchart of a method of brokering data 300 in accordance with another implementation of the present disclosure. In this implementation, the method 300 includes facilitating a compensation arrangement between a data provider and a data consumer regarding one or more data-provider-related search activities at 310 (e.g. negotiating for monetary payments to be paid to an individual by an advertiser in exchange for access to the individual's online search terms, agreeing to provide a discount on goods or services to members of an association in exchange for access to information related to browsing histories of the association's members, providing access to scientific literature to a group of scientists by a seller of scientific supplies in exchange for authorization to gather data regarding the group's accessing of the scientific literature, etc.). In some implementations, facilitating a compensation arrangement between a data provider and a data consumer regarding one or more data-provider-related search activities (at 310) may be performed by the data broker 130, or more specifically by one or more components of the data broker 130 (e.g. the arrangements component 134, the auctioning component 139, etc.).

Generally, facilitating a compensation arrangement between a data provider and a data consumer regarding one or more data-provider-related search activities (at 310), as well as other portions of the method 300 described herein, may be accomplished using the communications 120 between the data providers 110 and the data broker 130, or the communications 150 between the data broker 130 and the data consumer 170, or both. Additionally, in some implementations, facilitating a compensation arrangement between a data provider and a data consumer regarding one or more data-provider-related search activities (at 310)), as well as other portions of the method 300 described herein, may be accomplished via one or more of telephony (e.g. using the public switched telephone system), the internet (e.g., Voice over Internet Protocol), cellular telephone systems, satellite communication systems, instant messaging, text messaging, electronic mail ("email"), facsimiles, written communications, or any other suitable communications systems.

It will also be appreciated that facilitating a compensation arrangement between a data provider and a data consumer regarding one or more data-provider-related search activities (at 310)), as well as other portions of the method 300 described herein, may be accomplished using any suitably operable couplings between the data broker 130 and the one or more data providers 110 and data consumers 170, including physical connections (e.g. wires, cables, fiber-optic lines, etc.), or wireless connections (e.g. radio-frequency connections between cell phone and cell network towers, satellite towers, etc.) and/or some combination of physical connections and wireless connections, and may be accomplished using computing devices (e.g. computing device 200, servers, laptops, mainframes, personal data assistants, cell phones, etc.), or using one or more components of such devices (e.g processors 202, special purpose circuitry 282, application programs 232, other program modules 234, program data 236, network interface 252, wireless interface 255, serial port interface 242, other interfaces 216, 222, 228, etc.).

As further shown in FIG. 3, the method 300 may include providing a data product to the data consumer in accordance with the compensation arrangement at 320 (e.g. allowing a data consumer to access a specified quantity of search-related information stored in a data repository, transmitting a computer user's search terms to a marketing consultant on a periodic basis, downloading a browsing history to an online retailer in predetermined increments, providing an RSS feed of online search activities to an advertiser in a real-time manner, etc.). In some implementations, providing a data product to the data consumer in accordance with the compensation arrangement may be performed by the data broker 130, or more specifically, by one or more components of the data broker 130 (e.g. the data storage component 132, the arrangements component 134, the management and enforcement component 136, the auctioning component 139, etc.).

In some implementations, the method 300 may include monitoring a performance of the data consumer at 330 (e.g detecting a quantity of search-related information accessed by the data consumer, monitoring a benefit realized by a marketer attributable (or presumably attributable) to data provided to the marketer, measuring an increase in "hits" experienced by an online retailer, sensing a quantum of information analyzed by or on behalf of the data consumer, etc.). In general, monitoring a performance of the data consumer (at 330) may be performed using software (e.g. traffic monitoring software, speed monitoring software, transfer rates recorder, bandwidth usage software, keystroke monitoring, etc.) that monitors, records, or captures upload and download activities (e.g. at one or more interfaces of a computing device 200, at the processor 202, at the memory 204, etc.), hardware (e.g counters, meters, network cards, circuitry, etc.), firmware, or any suitable combination thereof. More specifically, monitoring a performance of the data consumer (at 330) may include one or more of monitoring (e.g. access requests, traffic volumes, access periods, access volumes, consumer and provider identities, hits, usage rates, provision rates, etc.), recordkeeping (e.g. access requests, traffic volumes, access periods, access volumes, consumer and provider identities, hits, usage rates, provision rates, etc.), access control (e.g. data rights management, license terms, restrictions on usage, privacy and confidentiality provisions, etc.), notification (e.g. transmitting alerts, warnings, reminders, notices, rates and limits, quality assurance, restrictions, etc.), capturing, or any other suitable functions in accordance with the terms and conditions of one or more of the agreements established between the parties.

With continued reference to FIG. 3, the method 300 may also include receiving compensation from the data consumer in accordance with the compensation arrangement at 340. For example, in some implementations, receiving compensation from the data consumer in accordance with the compensation arrangement (at 340) may be accomplished using electronic (wire or wireless) transfers of funds, electronic payments, credits and debit transactions, transmittals of checks or other negotiable instruments, or any other suitable methods of compensation exchange. In some implementations, receiving compensation from the data consumer in accordance with the compensation arrangement (at 340) may be accomplished using the communications 150 between the data broker 130 and the data consumers 170. More specifically, the compensation may be received from the data consumer 170 by the data broker 130, or by one or more components of the data broker 130 (e.g. the management and enforcement component 136, the compensation component 138, the arrangements component 134, the auctioning component 139, or any other suitable component).

The method 300 may include compensating the data provider in accordance with the compensation arrangement at 350. Again, in some implementations, compensating the data provider in accordance with the compensation arrangement (at 350) may be accomplished using electronic (wire or wireless) transfers of funds, electronic payments, credits and debit transactions, transmittals of checks or other negotiable instruments, or any other suitable methods of compensation exchange. More specifically, the compensation may be provided to the data provider by the data broker 130, or by one or more components of the data broker 130 (e.g. the management and enforcement component 136, the compensation component 138, the arrangements component 134, the auctioning component 139, or any other suitable component).

As noted above, in some implementations, one or more of the above-referenced portions of methods in accordance with the present disclosure (e.g. method 300) may be accomplished using the communications 120 between the data broker 130 and the data providers 110. Additionally, one or more of the above-referenced portions of methods in accordance with the present disclosure (e.g. method 300) may be accomplished via one or more of telephony (e.g using the public switched telephone system), the internet (e.g., Voice over Internet Protocol), cellular telephone systems, satellite communication systems, instant messaging, text messaging, electronic mail ("email"), facsimiles, written communications, or any other suitable communications systems, and may be accomplished using any suitably operable couplings between the data broker 130 and the one or more data providers 110 and data consumers 170, including physical connections (e.g. wires, cables, fiber-optic lines, etc.), or wireless connections (e.g. radio-frequency connections between cell phone and cell network towers, satellite towers, etc.) and/or some combination of physical connections and wireless connections, and may be accomplished using computing devices (e.g. computing device 200, servers, laptops, mainframes, personal data assistants, cell phones, etc.), or using one or more suitable components of such devices (e.g. processers 202, special purpose circuitry 282, application programs 232, other program modules 234, program data 236, network interface 252, wireless interface 255, serial port interface 242, other interfaces 216, 222, 228, etc.), or any other suitable methods or systems.

Exemplary Processes for Facilitating Compensation Arrangements

The preceding description has presented an exemplary "big picture" overview of possible implementations of processes in accordance with the present disclosure. In the following discussion, additional details of exemplary particular implementations are described. More specifically, it will be appreciated that facilitating a compensation arrangement between a data provider and a data consumer regarding one or more data-provider-related search activities (e.g. at 310 of the exemplary method 300 of FIG. 3) may be implemented in a variety of ways.

Figure 4:
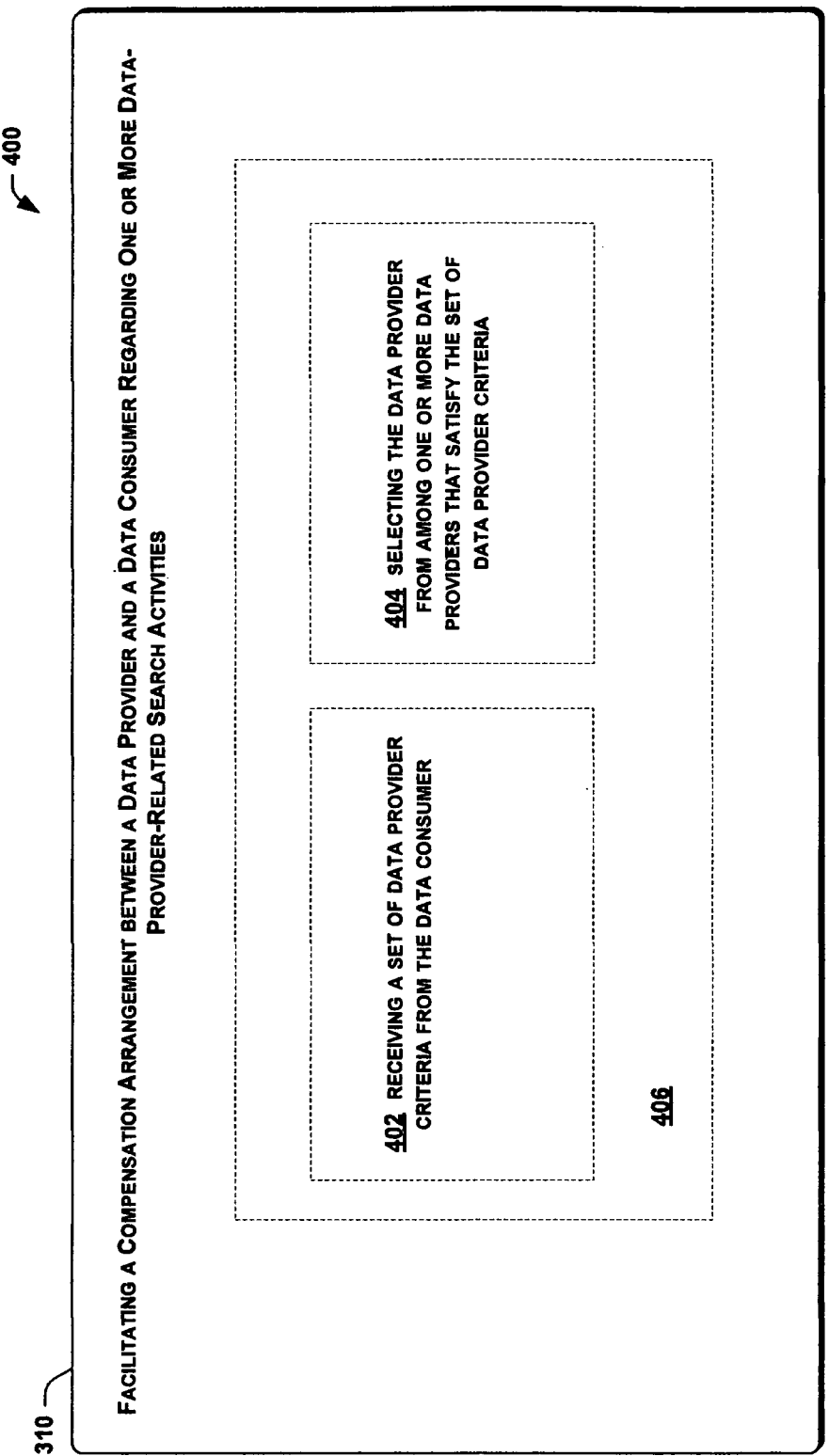
FIGS. 4 through 15 are flowcharts of methods of facilitating compensation arrangements between data providers and data consumers in accordance with further implementations of the present disclosure.

For example, in an implementation 400 shown in FIG. 4, facilitating a compensation arrangement between a data provider and a data consumer regarding one or more data-provider-related search activities at 310 (FIG. 3) may include receiving a set of data provider criteria from the data consumer at 402, and selecting the data provider from among one or more data providers that satisfy the set of data provider criteria at 404, or both at 406. For example, in particular implementations, receiving a set of data provider criteria from the data consumer at 402 may include receiving a requirement from a data consumer that the data provider be employed in a particular field (e.g. a seller of medical supplies requiring that the data provider be employed in a medically-oriented profession, such as a physician, nurse, radiologist, surgeon, osteopath, neurologist, psychologist, etc; or an advertiser of books requiring that the data provider be a member of a particular society or association of professionals, such as IEEE, EPLA, etc.), or be affiliated with one or more particular personal characteristics (e.g. an investment advisor requiring that the data provider be older than a specified minimum age; or an advertiser of religious-education seminars specifying that the data provider be unmarried and have a particular religious affiliation; or a clothing designer indicating a preferred hierarchy of female data providers based on specified geographic regions), or any other suitable data provider criteria. Similarly, in particular implementations, selecting the data provider from among one or more data providers that satisfy the set of data provider criteria at 404 may include selecting members of a youth-affiliated organization (e.g Boy Scouts of America, enrolled university students, etc.) over members of other organizations (e.g. AARP, UAW, etc.) to better satisfy criteria provided by vendors of video games, or proposing members of a particular organization (e.g AA, AAA, NRA, etc.) as candidate data providers to meet preferred personal characteristics established by a data consumer (e.g. married individuals, responsible drivers, firearm enthusiasts, etc.).

Additionally, selecting the data provider from among one or more data providers that satisfy the set of data provider criteria at 404 may be accomplished in an automated or semi-automated manner using one or more algorithms that are configured to analyze and compare candidate data providers in view of the set of data provider criteria (received at 402). For example, in some implementations, the selection of candidate data providers (at 404) may be performed by applying computer programs or mathematical algorithms (e.g data-fitting algorithms, feature selection/extraction algorithms, Monte Carlo algorithms, Bayesian algorithms, leaning algorithms, filtering algorithms, optimization algorithms, stochastic algorithms, Fast-Fourier Transform (FFT) algorithms, etc.) that compare data provider criteria with members of a pool of candidate data providers to select those candidate data providers that best meet the established or desired criteria. Of course, in other implementations, the selecting of the "best" data providers (at 404) may be performed manually, semi-manually, or even randomly.

In some implementations, the terms and conditions associated with the compensation arrangements may also be facilitated. For example, as shown in FIG. 5, in an implementation 330, facilitating a compensation arrangement between a data provider and a data consumer regarding one or more data-provider-related search activities (at 310) may include arranging for compensation to be received from a data consumer in exchange for data gathering related to the data provider at 332 (e.g. arranging for a monthly transfer of finds from a bank account of a search provider into a bank account of a company or individual; establishing a credit account at a retail outlet for members of a data-providing organization; providing for an issuance of discount coupons to an individual that owns or operates equipment that provides a data product to a data consumer).

In some implementations, arranging for compensation to be received from a data consumer in exchange for data gathering related to the data provider (at 332) may include arranging for compensation to be received from a data consumer in exchange for data gathering related to at least one networking device associated with the data provider at 334 (e.g establishing a payment schedule from a market research department to an entity for information received from a computer, server, switch, firewall, security appliance, cellular phone, a personal data assistant (PDA), television, etc. associated with the entity). In other implementations, arranging for compensation to be received from a data consumer in exchange for data gathering related to the data provider (at 332) may include arranging for compensation to be received from a data consumer in exchange for data gathering related to at least one computing device associated with the data provider at 336 (e.g. arranging for a swap of computer equipment from an OEM in exchange for quarterly data gathering associated with a company's desktop computers, laptop computers, notebook computers, mainframe computers, servers, PDAs, etc.). In further implementations, arranging for compensation to be received from a data consumer in exchange for data gathering related to the data provider (at 332) may include arranging for compensation to be received from a data consumer in exchange for data gathering related to at least one personal communications device associated with the data provider at 338 (e.g. providing for a monthly fee to a real estate agent for data gathered from the agent's cellular phone, PDA, navigational device, laptop, mobile communication device, etc.).

Figure 5:
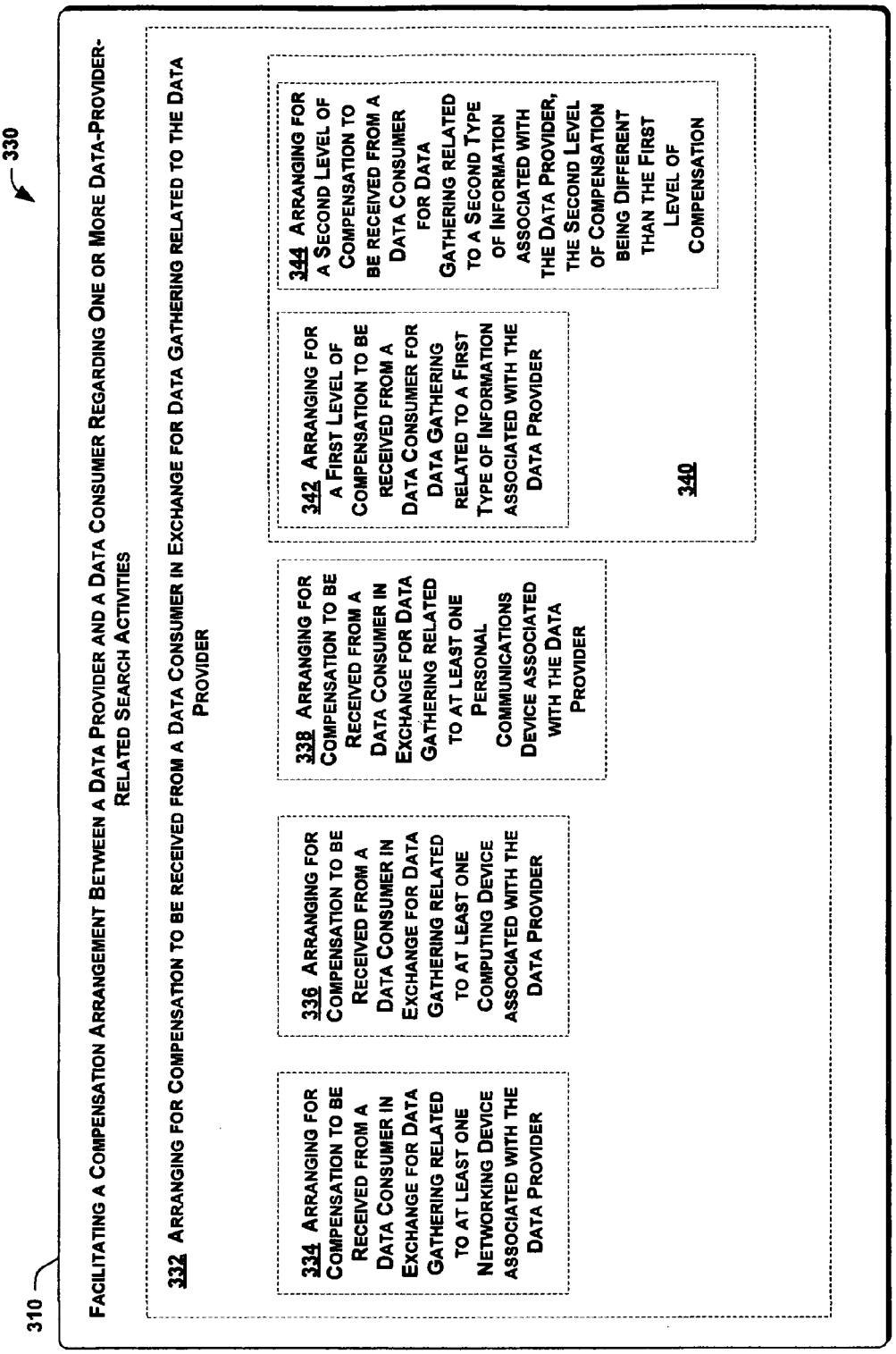

As further shown in FIG. 5, in further implementations, arranging for compensation to be received from a data consumer in exchange for data gathering related to the data provider (at 332) may include arranging for a first level of compensation to be received from a data consumer in exchange for data gathering related to a first type of information associated with the data provider at 342, and arranging for a second level of compensation to be received from the data consumer in exchange for data gathering related to a second type of information associated with the data provider, the second level of compensation being different than the first level of compensation at 344, or both at 340. For example, in some implementations, such arranging includes arranging for a higher level of payment (e.g. $1 per x number of search terms, 1000 yen per Terrabyte of information, etc.) for data gathering related to a data provider's health-related interests (e.g. high blood pressure, cancer, naturopathic treatments, acupuncture, anxiety medications, etc.), and a lower level of payment (e.g. $0.01 per x number of search terms, 1 yen per TB, free movie passes, etc.) for data gathering related to the data provider's hobby-related interests (e.g. favorite sports, travel interests, painting, crafts, coin collecting, etc.), or vice versa.

Figure 6:
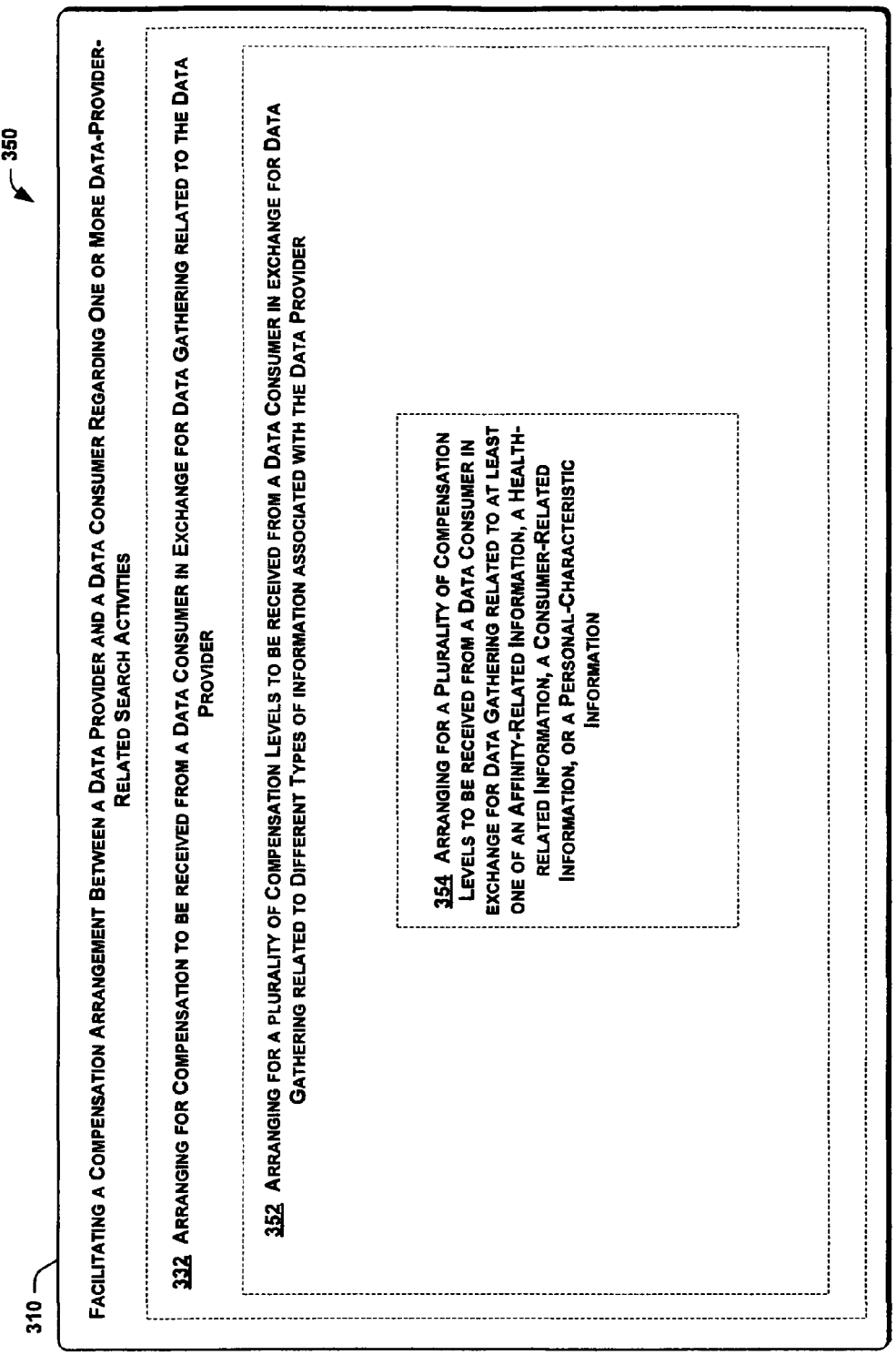

In some implementations, a plurality of compensation levels may be arranged in exchange for data gathering related to different types of information. For example, as shown in FIG. 6, in an implementation 350, arranging for compensation to be received from a data consumer in exchange for data gathering related to the data provider (at 332) may include arranging for a plurality of compensation levels to be received from a data consumer in exchange for data gathering related to different types of information associated with the data provider at 352 (e.g. establishing a premium level of payment for consumer-related information (e.g purchasing habits, credit habits, etc.), a standard level of payment for personal-characteristic information (e.g. gender, age, education, employment status, marital status, etc.), and a discount compensation level (e.g. store credit, coupon, etc.) for all other information associated with the data provider.

In some implementations, arranging for a plurality of compensation levels to be received from a data consumer in exchange for data gathering related to different types of information associated with the data provider (at 352) may include arranging for a plurality of compensation levels to be received from a data consumer in exchange for data gathering related to at least one of an affinity-related information, a health-related information, a consumer-related information, a personal-characteristic-related information, or a business-entity-related information at 354. For example, in some implementations, such arranging may include arranging for a first compensation in exchange for data gathering related to affinity-related information (e.g. sports affinity information, religious affinity information, music affinity information, literature affinity information, theater affinity information, film affinity information, television program affinity information, hobby affinity information, service affinity information, product affinity information, etc.), a second compensation for health-related information (e.g. an ailment-related information, a condition-related information, a disease-related information, a treatment-related information, a prevention-related information, a diet-related information, an exercise-related information, a mental-health related information, or a wellness-related information, etc.), a third compensation for consumer-related information (e.g. a purchasing-related information, a spending-related information, an income-related information, a credit-worthiness-related information, a subscription-related information, an ordering-related information, a shopping-related information, a browsing-related information, a credit card-related information, a debit card-related information, a check writing-related information, a delivery-related information, a coupon-related information, a selling-method-related information, an offering-related information, a promotional-event-related information, an advertising-related information, etc.), a fourth compensation level for personal-characteristic information (e.g an age-related information, a gender-related information, a race-related information, an income-related information, a geographic location-related information, a marital status-related information, an education-related information, an employment-related information, a sexual orientation-related information, a cultural-related information, a personality characteristic-related information, a demographic-related information, etc.), and a fifth compensation for business-entity related information (e.g. an employment-related information, a management-related information, a marketing-related information, a sales-related information, a plan-related information, a profit-related information, a loss-related information, an asset-related information, a liability-related information, an inventory-related an employment-related activity, a management-related activity, a marketing-related activity, a sales-related activity, a plan-related activity, a profit-related activity, a loss-related activity, an asset-related activity, a liability-related activity, an inventory-related activity, and an overhead-related acti, and an overhead-related information, etc.).

Figure 7:
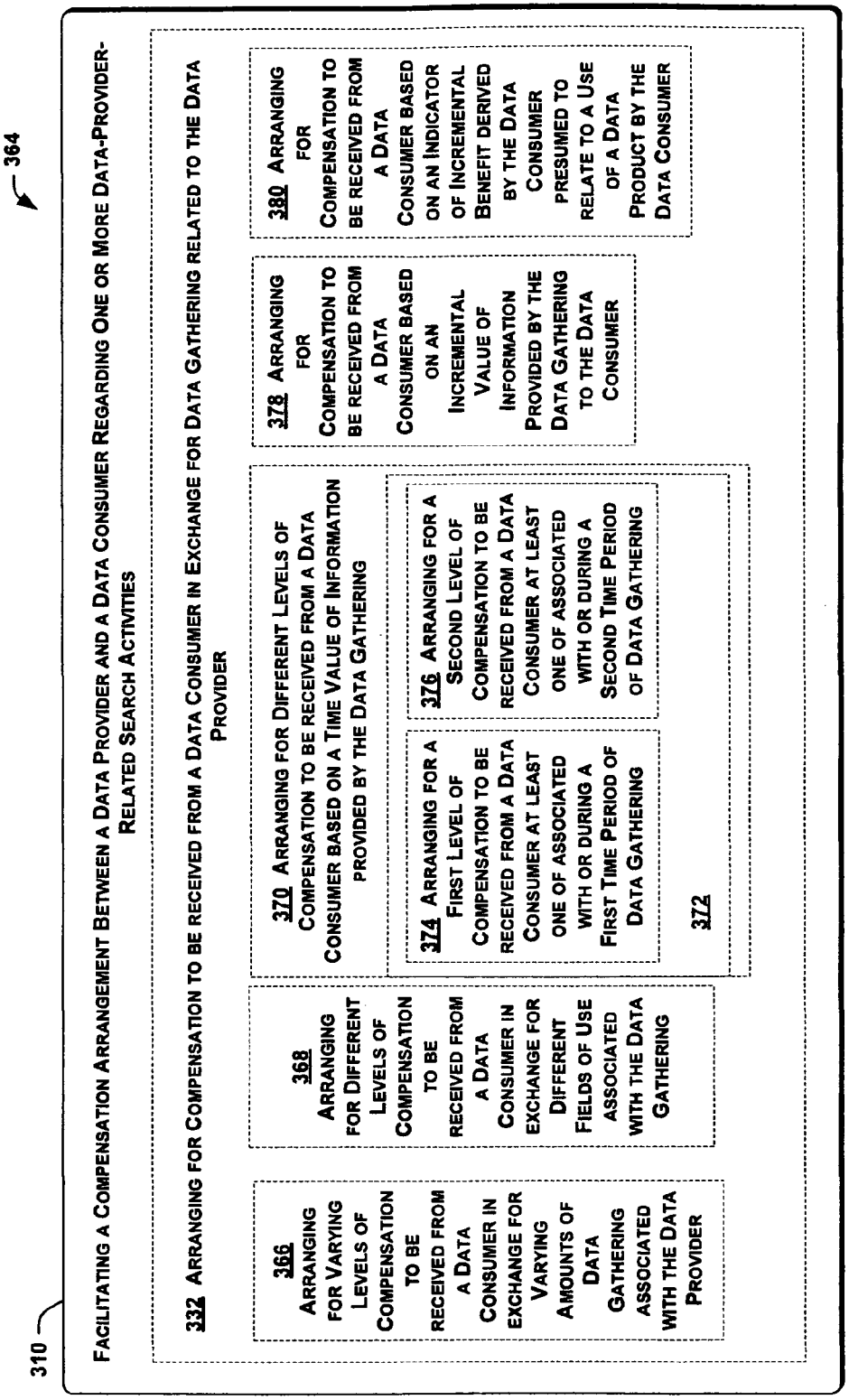

As shown in FIG. 7, in another implementation 364, facilitating a compensation arrangement between a data provider and a data consumer regarding one or more data-provider-related search activities (at 310 of FIG. 1) may include arranging for compensation to be received from a data consumer in exchange for data gathering related to the data provider at 332, and arranging for compensation to be received from a data consumer in exchange for data gathering related to the data provider (at 332) may arranging for varying levels of compensation to be received from a data consumer in exchange for varying amounts of data gathering associated with the data provider at 362 payment (e.g. arranging for $1 per unit of information provided; arranging for $1 per unit of information provided during a first week, and $0.5 per unit of information provided during a second week; arranging for 1000 yen per unit for the first million units, 1100 yen per unit for the second million units, 1200 per unit for the third million units, etc.).

Similarly, in other implementations, arranging for compensation to be received from a data consumer in exchange for data gathering related to the data provider (at 332) may include arranging for different levels of compensation to be received from a data consumer in exchange for different fields of use associated with the data gathering at 364 (e.g. arranging for compensation of $1 per unit of information for online advertising uses, $0.05 per unit for medical research uses, etc.; arranging for a 20% discount on the cost of goods or services for targeted marketing uses, and a 2% discount on the cost of goods or services for product development uses, etc.).

In further implementations, arranging for compensation to be received from a data consumer in exchange for data gathering related to the data provider (at 332) may include arranging for different levels of compensation to be received from a data consumer based on a time value of information provided by the data gathering at 366 (e.g. arranging for a first compensation for information provided during an early time period, and a second compensation for information provided during a later time period). In some implementations, arranging for different levels of compensation to be received from a data consumer based on a time value of information provided by the data gathering (at 366) may include arranging for a first level of compensation to be received from a data consumer at least one of associated with or during a first time period of data gathering at 370 (e.g a higher compensation provided during an earlier time period), and arranging for a second level of compensation to be received from the data consumer at least one of associated with or during a second time period of data gathering at 372 (e.g. a lower compensation provided during a later time period), or both at 368 (e.g a lower compensation provided during an earlier time period and a higher compensation provided during a later time period).

As further shown in FIG. 7, in some implementations, arranging for compensation to be received from a data consumer in exchange for data gathering related to the data provider (at 332) may include arranging for compensation to be received from a data consumer based on an incremental value of information provided by the data gathering to the data consumer at 374. For example, the compensation to be received from a data consumer may be based on the data consumer's increase in revenue, sales volume, traffic, or other indicator of incremental value (actual or presumed). Similarly, in some implementations, arranging for compensation to be received from a data consumer in exchange for data gathering related to the data provider (at 332) may include arranging for compensation to be received from a data consumer based on an indicator of incremental benefit derived by the data consumer presumed to relate to a use of a data product by the data consumer at 376. Again, for example, the compensation to be received from a data consumer may be based on the data consumer's increase in revenue, sales volume, network traffic (e.g. website visits, hits, orders, etc.), or any other suitable indicator of incremental benefit derived by the data consumer presumed to relate to a use of a data product.

Figure 8:
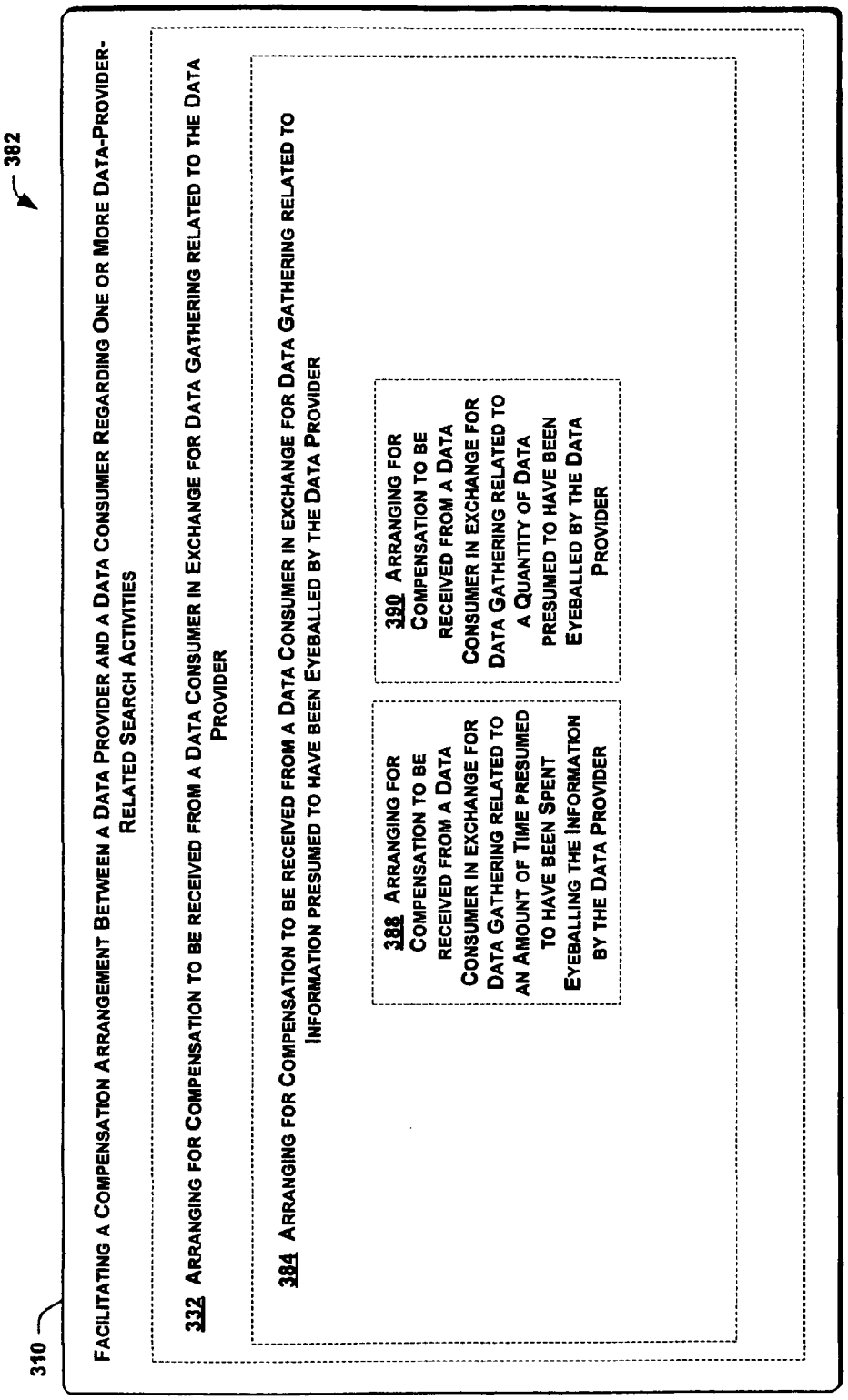

In further implementations, compensation to be received from a data consumer may be arranged based on information presumed to have been "eyeballed" (including information actually eyeballed) by the data provider. For example, as shown in FIG. 8, in another implementation 382, facilitating a compensation arrangement between a data provider and a data consumer regarding one or more data-provider-related search activities (at 310 of FIG. 3) may include arranging for compensation to be received from a data consumer in exchange for data gathering related to the data provider (at 332), which may in turn include arranging for compensation to be received from a data consumer in exchange for data gathering related to information presumed to have been eyeballed by the data provider at 384 (e.g. arranging for compensation from an online advertiser based on an actual time spent having a webpage opened by a browser; arranging for compensation from an online retailer based on cursor movement or non-movement during a time a webpage remains opened by a browser, etc.).

More specifically, in some implementations, arranging for compensation to be received from a data consumer in exchange for data gathering related to information presumed to have been eyeballed by the data provider (at 384) may include arranging for compensation to be received from a data consumer in exchange for data gathering related to an amount of time presumed to have been spent eyeballing the information by the data provider at 388 (e.g. arranging for compensation from a marketing consultant based on a time period spent browsing various websites; arranging for compensation from an online search provider based on scrolling history during browsing activities, etc.). In further implementations, arranging for compensation to be received from a data consumer in exchange for data gathering related to information presumed to have been eyeballed by the data provider (at 384) may include arranging for compensation to be received from a data consumer in exchange for data gathering related to a quantity of data presumed to have been eyeballed by the data provider at 390 (e.g. arranging for compensation from a data consumer based on a number of sites visited by a data provider prior to making a purchase; arranging for compensation based on numbers of pages viewed by a data provider during browsing activities, etc.).

Figure 9:
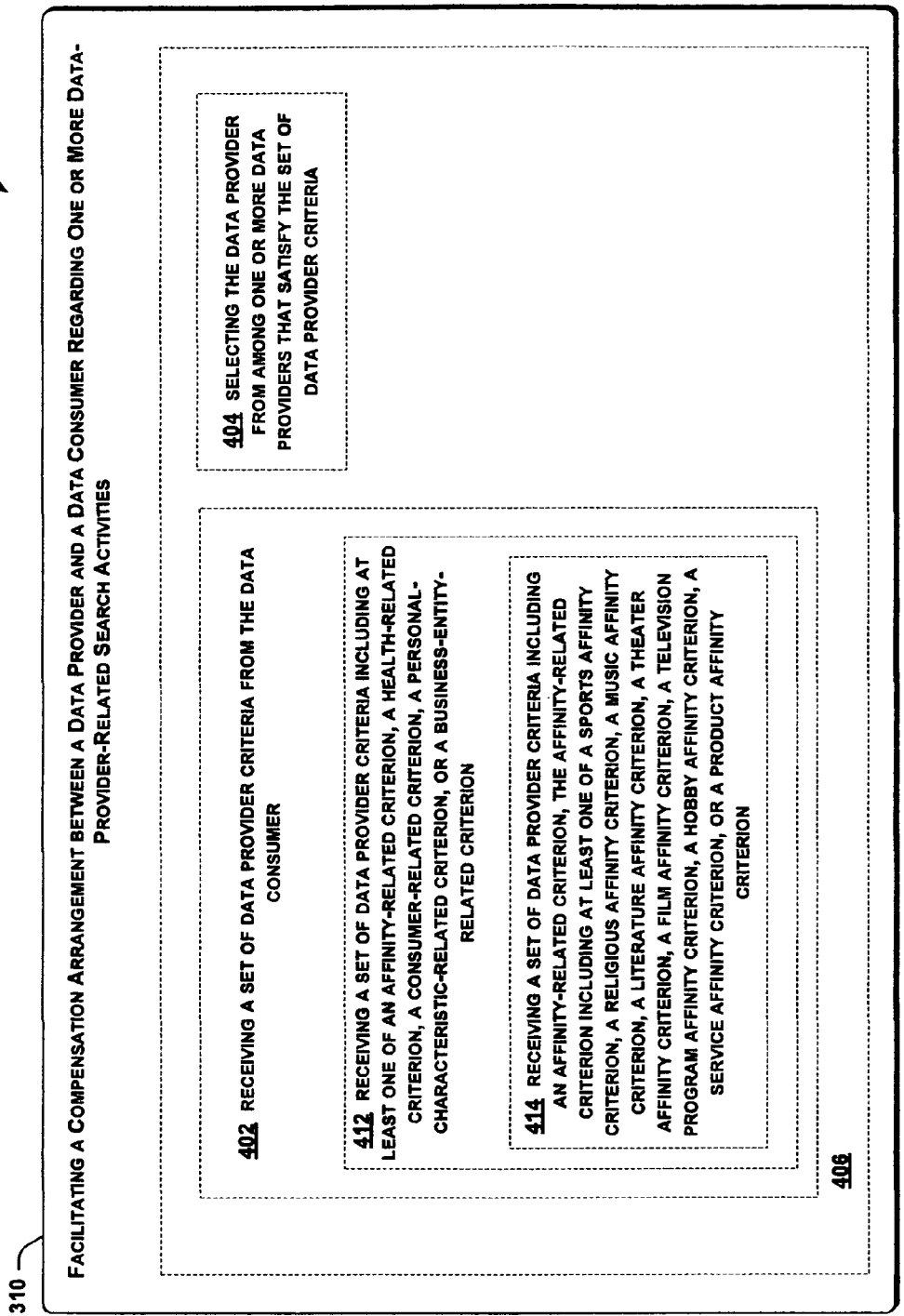

As described above with reference to FIG. 4, in some implementations, facilitating a compensation arrangement between a data provider and a data consumer regarding one or more data-provider-related search activities at 310 (FIG. 3) may include receiving a set of data provider criteria from the data consumer at 402, and selecting the data provider from among one or more data providers that satisfy the set of data provider criteria at 404, or both at 406. More specifically, as shown in FIG. 9, in an implementation 410, receiving a set of data provider criteria from the data consumer at 402 may include receiving a set of data provider criteria including at least one of an affinity-related criterion, a health-related criterion, a consumer-related criterion, a personal-characteristic-related criterion, or a business-entity-related criterion at 412. More specifically, in some implementations, receiving a set of data provider criteria including at least one of an affinity-related criterion, a health-related criterion, a consumer-related criterion, a personal-characteristic-related criterion, or a business-entity-related criterion (at 412) may include receiving a set of data provider criteria including an affinity-related criterion, the affinity-related criterion including at least one of a sports affinity criterion, a religious affinity criterion, a music affinity criterion, a literature affinity criterion, a theater affinity criterion, a film affinity criterion, a television program affinity criterion, a hobby affinity criterion, a service affinity criterion, or a product affinity criterion at 414.

Figure 10:
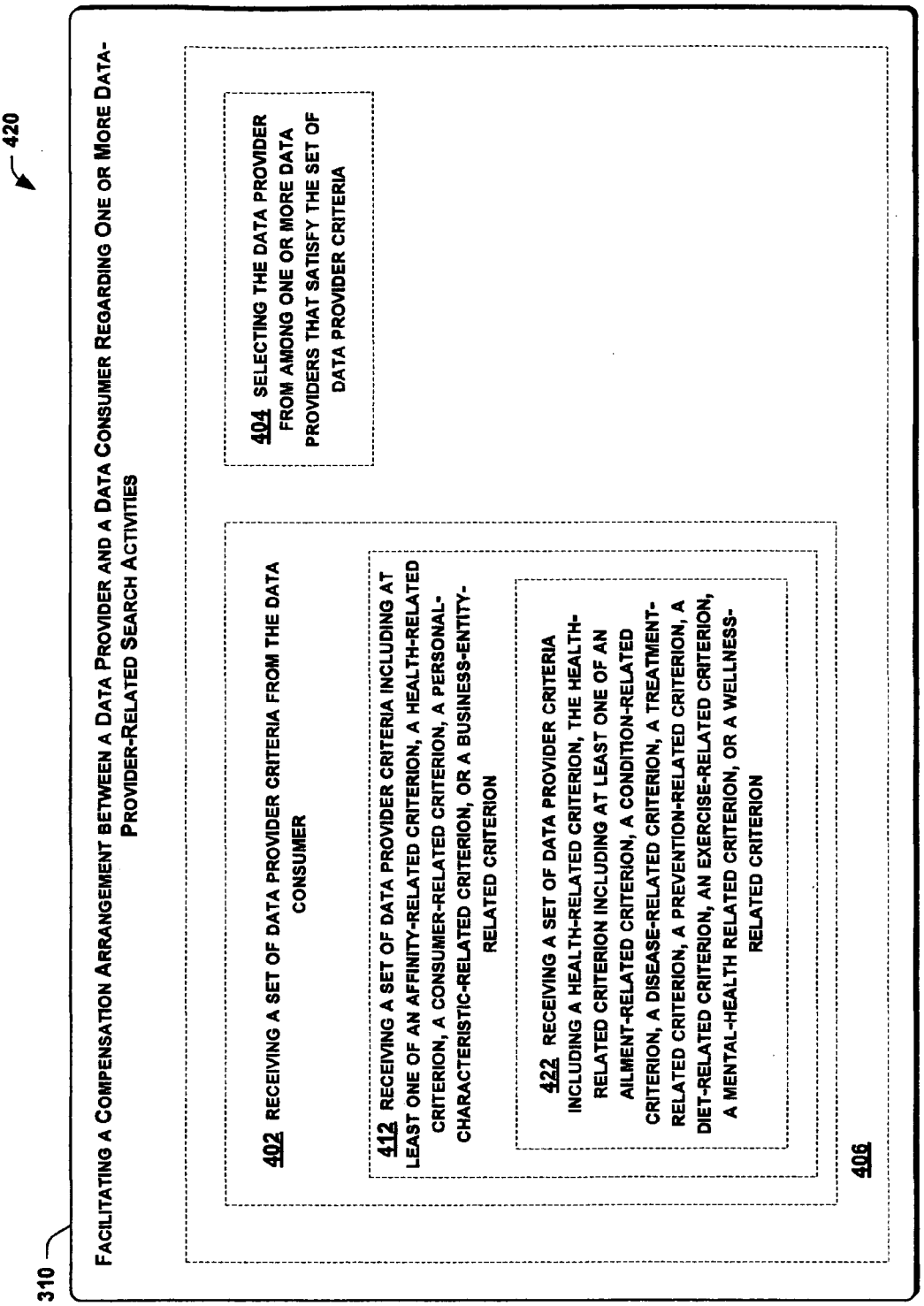

In another implementation 420 shown in FIG. 10, receiving a set of data provider criteria including at least one of an affinity-related criterion, a health-related criterion, a consumer-related criterion, a personal-characteristic-related criterion, or a business-entity-related criterion (at 412) may include receiving a set of data provider criteria including a health-related criterion, the health-related criterion including at least one of an ailment-related criterion, a condition-related criterion, a disease-related criterion, a treatment-related criterion, a prevention-related criterion, a diet-related criterion, an exercise-related criterion, a mental-health related criterion, or a wellness-related criterion at 422.

Figure 11:
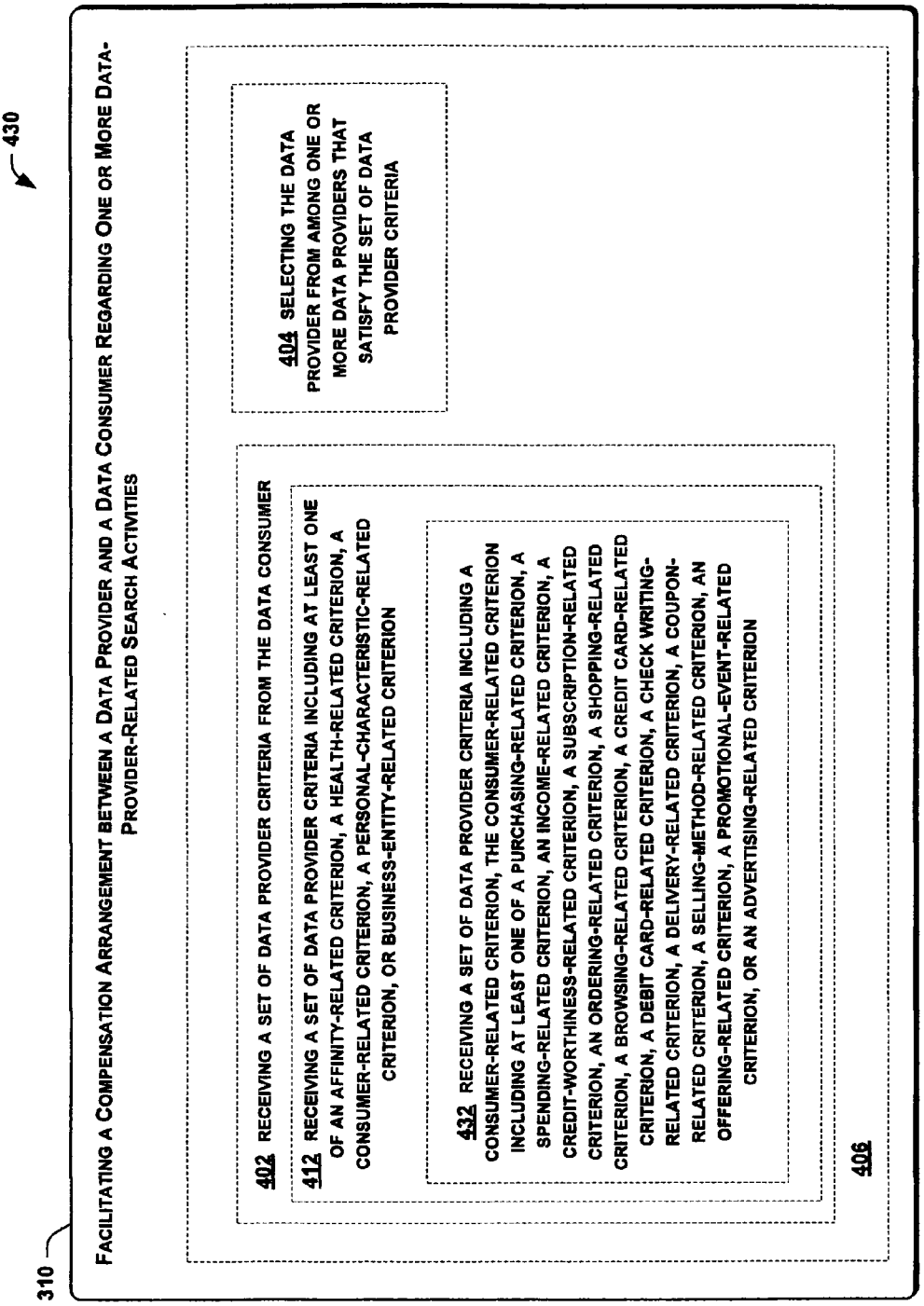

As shown in FIG. 11, in another implementation 430, receiving a set of data provider criteria including at least one of an affinity-related criterion, a health-related criterion, a consumer-related criterion, a personal-characteristic-related criterion, or a business-entity-related criterion (at 412) may include receiving a set of data provider criteria including a consumer-related criterion, the consumer-related criterion including at least one of a purchasing-related criterion, a spending-related criterion, an income-related criterion, a credit-worthiness-related criterion, a subscription-related criterion, an ordering-related criterion, a shopping-related criterion, a browsing-related criterion, a credit card-related criterion, a debit card-related criterion, a check writing-related criterion, a delivery-related criterion, a coupon-related criterion, a selling-method-related criterion, an offering-related criterion, a promotional-event-related criterion, or an advertising-related criterion at 432.

Figure 12:
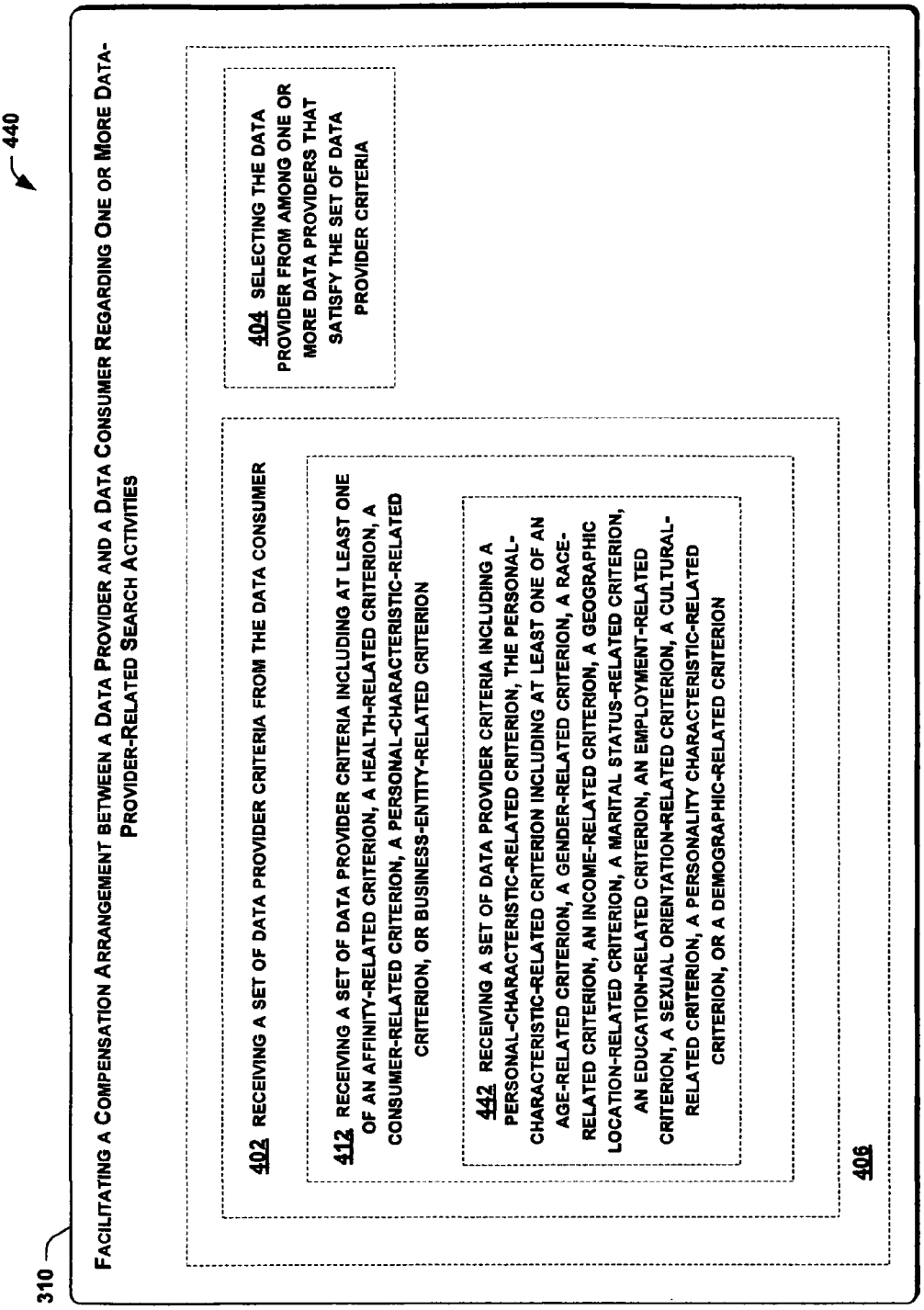

In a further implementation 440 shown in FIG. 12, receiving a set of data provider criteria including at least one of an affinity-related criterion, a health-related criterion, a consumer-related criterion, a personal-characteristic-related criterion, or a business-entity-related criterion (at 412) may include receiving a set of data provider criteria including a personal-characteristic-related criterion, the personal-characteristic-related criterion including at least one of an age-related criterion, a gender-related criterion, a race-related criterion, an income-related criterion, a geographic location-related criterion, a marital status-related criterion, an education-related criterion, an employment-related criterion, a sexual orientation-related criterion, a cultural-related criterion, a personality characteristic-related criterion, or a demographic-related criterion at 442.

Figure 13:
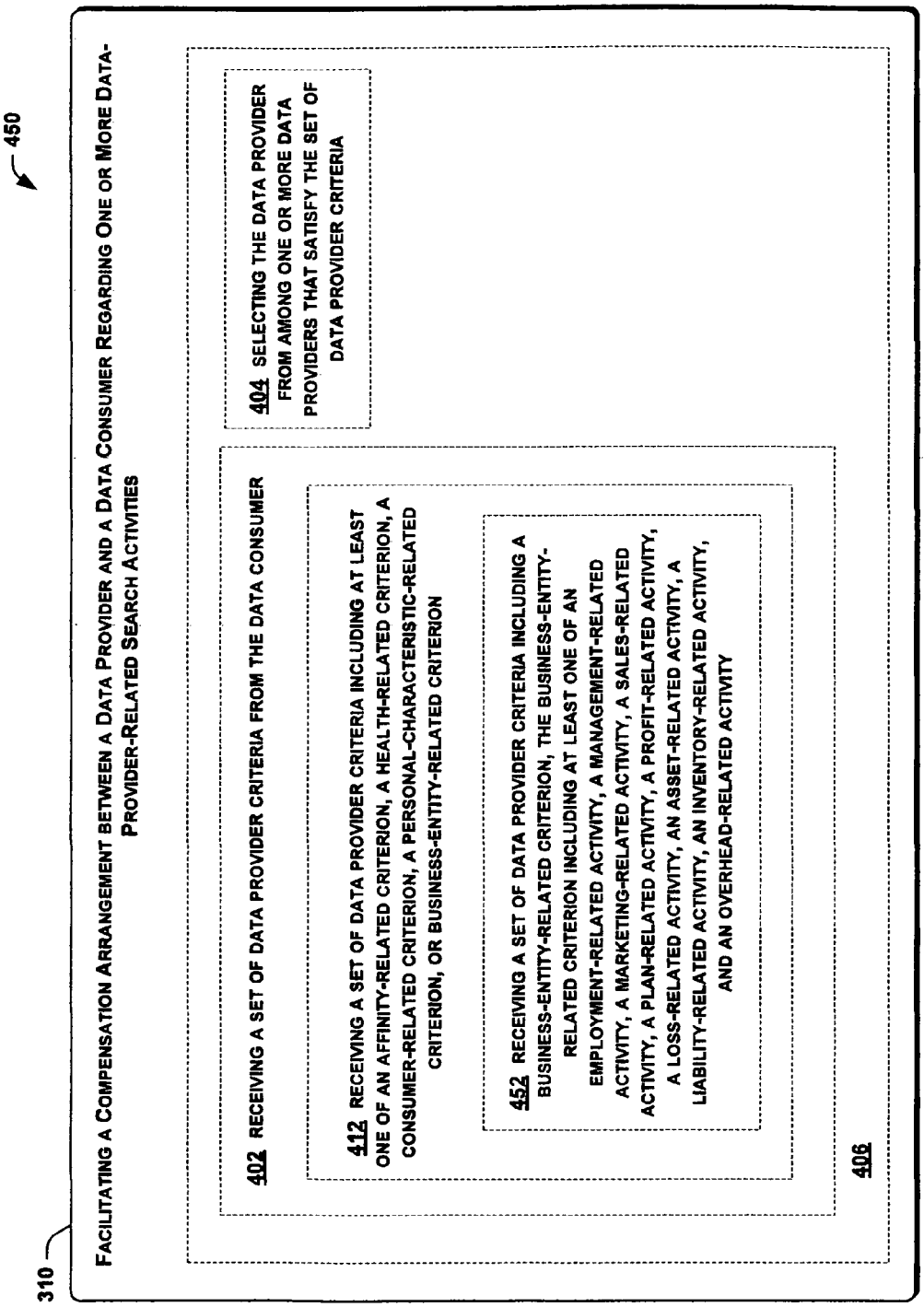

Additionally, in still another implementation 450 shown in FIG. 13, receiving a set of data provider criteria from the data consumer at 402 may include receiving a set of data provider criteria including a business-entity-related criterion, the business-entity-related criterion including at least one of an employment-related activity, a management-related activity, a marketing-related activity, a sales-related activity, a plan-related activity, a profit-related activity, a loss-related activity, an asset-related activity, a liability-related activity, an inventory-related activity, and an overhead-related activity at 452.

Figure 14:
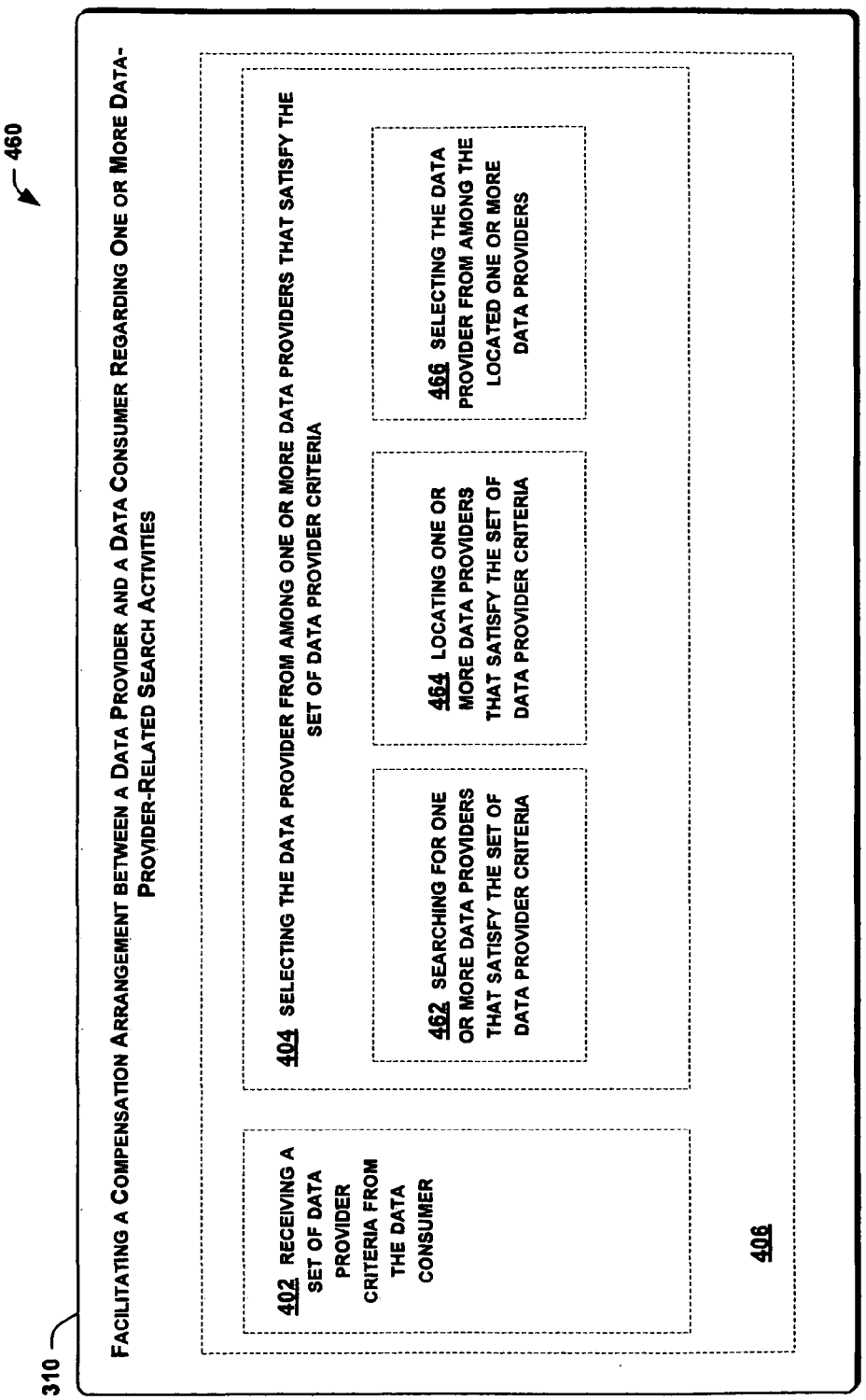

In an implementation 460 shown in FIG. 14, selecting the data provider from among one or more data providers that satisfy the set of data provider criteria (at 404) may include searching for one or more data providers that satisfy the set of data provider criteria at 462. Similarly, selecting the data provider from among one or more data providers that satisfy the set of data provider criteria (at 404) may include locating one or more data providers that satisfy the set of data provider criteria at 464. Also, as further shown in FIG. 14, selecting the data provider from among one or more data providers that satisfy the set of data provider criteria (at 404) may include selecting the data provider from among the located one or more data providers at 466. The activities at 462, 464, 466 may be accomplished manually or semi-manually, or in an automated or semi-automated manner using, for example, one or more search algorithms (e.g. heuristic search, constraint satisfaction search, tree search, graph search, list search, uninformed search, interpolation, extrapolation, etc.) or other suitable algorithms (e.g. data-fitting algorithms, feature selection/extraction algorithms, Monte Carlo algorithms, Bayesian algorithms, learning algorithms, filtering algorithms, optimization algorithms, stochastic algorithms, Fast-Fourier Transform (FFT) algorithms, etc.).

Figure 15:
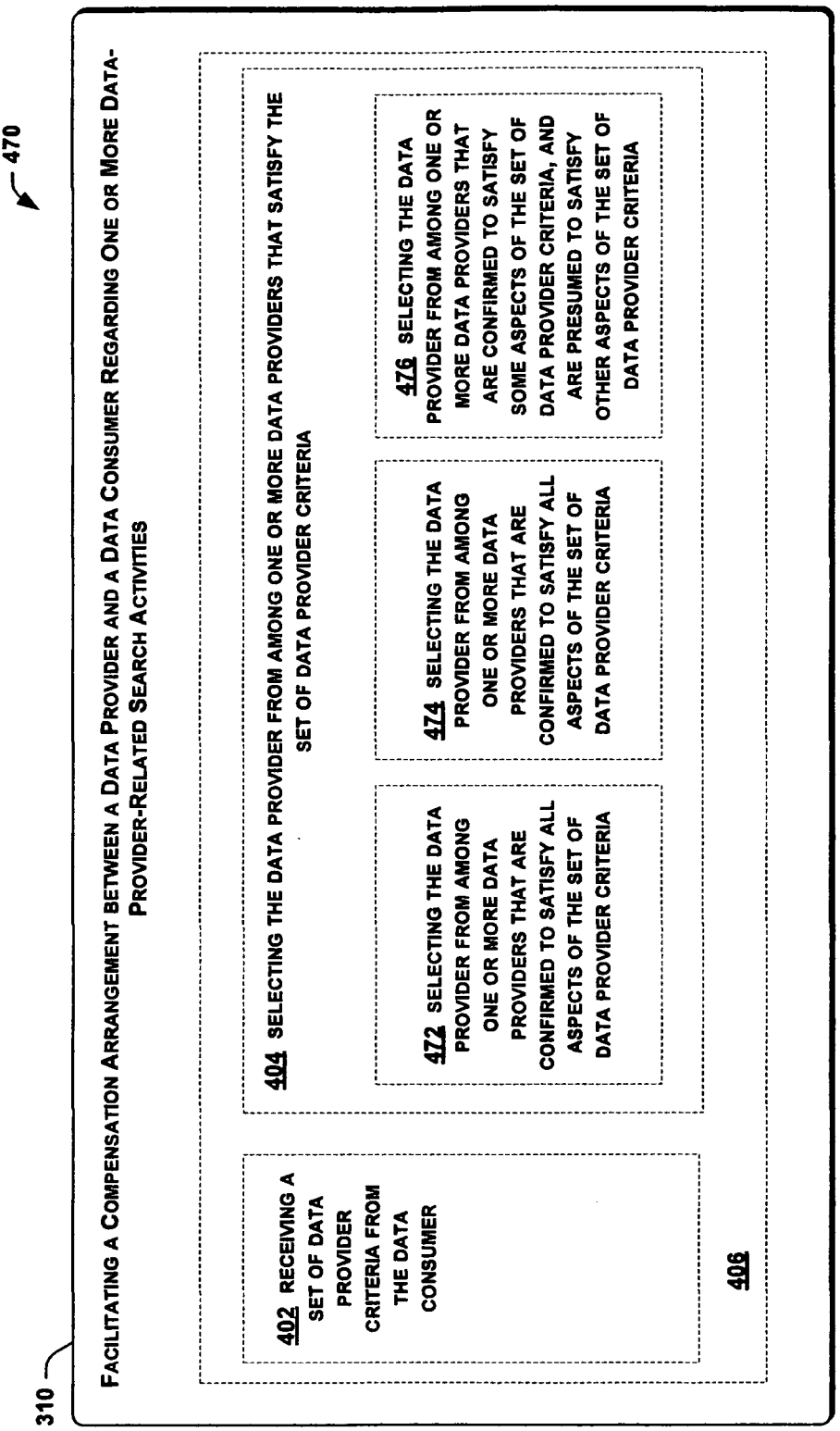

As shown in FIG. 15, in yet another implementation 470, selecting the data provider from among one or more data providers that satisfy the set of data provider criteria (at 404) may include selecting the data provider from among one or more data providers that are confirmed to satisfy all aspects of the set of data provider criteria at 472. Similarly, selecting the data provider from among one or more data providers that satisfy the set of data provider criteria (at 404) may include selecting the data provider from among one or more data providers that are confirmed to satisfy some aspects of the set of data provider criteria, and are presumed to satisfy other aspects of the set of data provider criteria at 474. Also, selecting the data provider from among one or more data providers that satisfy the set of data provider criteria (at 404) may include selecting the data provider from among one or more data providers that are presumed to satisfy the set of data provider criteria at 476.

Again, the activities at 472, 474, 476 may be accomplished manually or semi-manually, or in an automated or semi-automated manner using, for example, one or more search algorithms (e.g. heuristic search, constraint satisfaction search, tree search, graph search, list search, uninformed search, interpolation, extrapolation, etc.) or other suitable algorithms (e.g data-fitting algorithms, feature selection/extraction algorithms, Monte Carlo algorithms, Bayesian algorithms, learning algorithms, filtering algorithms, optimization algorithms, stochastic algorithms, Fast-Fourier Transform (FFT) algorithms, etc.).

Generally, the activities associated with facilitating a compensation arrangement between a data provider and a data consumer regarding one or more data-provider-related search activities (e.g. at 310 of the method 300 of FIG. 3) may be accomplished manually or semi-manually, or in an automated or semi-automated manner, and may use the communications 120 between the data providers 110 and the data broker 130, or the communications 150 between the data broker 130 and the data consumer 170, or both. Additionally, such activities may be accomplished via one or more of telephony (e.g. using the public switched telephone system), the internet (e.g., Voice over Internet Protocol), cellular telephone systems, satellite communication systems, instant messaging, text messaging, electronic mail ("email"), facsimiles, written communications, or any other suitable communications systems, and may be accomplished using any suitably operable couplings between the data broker 130 and the one or more data providers 110 and data consumers 170, including physical connections (e.g. wires, cables, fiber-optic lines, etc.), or wireless connections (e.g. radio-frequency connections between cell phone and cell network towers, satellite towers, etc.) and/or some combination of physical connections and wireless connections, and may be accomplished using computing devices (e.g computing device 200, servers, laptops, mainframes, personal data assistants, cell phones, etc.), or using one or more components of such devices (e.g processers 202, special purpose circuitry 282, application programs 232, other program modules 234, program data 236, network interface 252, wireless interface 255, serial port interface 242, other interfaces 216, 222, 228, etc.), or any other suitable systems or methods.

It should be appreciated that the particular embodiments of processes described herein are merely possible implementations of the present disclosure, and that the present disclosure is not limited to the particular implementations described herein and shown in the accompanying figures. For example, in alternate implementations, certain acts need not be performed in the order described, and may be modified, and/or may be omitted entirely, depending on the circumstances. Moreover, in various implementations, the acts described may be implemented by a computer, controller, processor, programmable device, or any other suitable device, and may be based on instructions stored on one or more computer-readable media or otherwise stored or programmed into such devices. In the event that computer-readable media are used, the computer-readable media can be any available media that can be accessed by a device to implement the instructions stored thereon.

Various methods, systems, and techniques may be described and implemented in the general context of computer-executable instructions, such as program modules, executed by one or more processors or other devices. Generally, program modules include routines, programs, objects, components, data structures, etc. that perform particular tasks or implement particular abstract data types. Typically, the functionality of the program modules may be combined or distributed as desired in various alternate embodiments. In addition, embodiments of these methods, systems, and techniques may be stored on or transmitted across some form of computer readable media.

It may also be appreciated that there may be little distinction between hardware and software implementations of aspects of systems and methods disclosed herein. The use of hardware or software may generally be a design choice representing cost vs. efficiency tradeoffs, however, in certain contexts the choice between hardware and software can become significant. Those having skill in the art will appreciate that there are various vehicles by which processes, systems, and technologies described herein can be effected (e.g., hardware, software, firmware, or combinations thereof), and that a preferred vehicle may vary depending upon the context in which the processes, systems, and technologies are deployed. For example, if an implementer determines that speed and accuracy are paramount, the implementer may opt for a mainly hardware and/or firmware vehicle. Alternatively, if flexibility is paramount, the implementer may opt for a mainly software implementation. In still other implementations, the implementer may opt for some combination of hardware, software, and/or firmware. Hence, there are several possible vehicles by which the processes and/or devices and/or other technologies described herein may be effected, and which may be desired over another may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into workable systems having the described functionality. That is, at least a portion of the devices and/or processes described herein can be developed into a workable system via a reasonable amount of experimentation.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" (or "operatively connected," or "operatively coupled") to each other to achieve the desired functionality, and any two components capable of being so associated can also be viewed as being "operably couplable" (or "operatively couplable") to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. For example, in some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

As a further example of "open" terms in the present specification and claims, it will be understood that usage of a language construction "A or B" is generally interpreted as a non-exclusive "open term" meaning: A alone, B alone, and/or A and B together.

Although various features have been described in considerable detail with reference to certain preferred embodiments, other embodiments are possible. Therefore, the spirit or scope of the appended claims should not be limited to the description of the embodiments contained herein.

What is claimed is:

1. A computer-implemented method, comprising:
   facilitating a compensation arrangement between a data provider and a data consumer regarding one or more data-provider-related search activities, comprising:
   a) receiving a set of data provider criteria from the data consumer;
   b) selecting the data provider from among one or more data providers that satisfy the set of data provider criteria;
   c) arranging for compensation to be received from the data consumer in exchange for access to at least one or more data provider-related search activities, wherein access to the at least one or more data provider-related search activities includes access to a data counter of data from the at least one or more data provider-related search activities; and
   d) performing an analysis to determine a potential value of the data, wherein the potential value includes a time value of the data, wherein the time value is at least partially based on when the data was acquired; and
   wherein the facilitating, receiving, selecting or arranging is at least partially implemented using one or more processing devices.

2. The computer-implemented method of claim 1, wherein receiving a set of data provider criteria from the data consumer comprises:
   receiving the set of data provider criteria including at least one of an affinity-related criterion, a health-related criterion, a consumer-related criterion, a personal-characteristic-related criterion, or a business-entity-related criterion.

3. The computer-implemented method of claim 2, wherein receiving the set of data provider criteria including at least one of an affinity-related criterion, a health-related criterion, a consumer-related criterion, a personal-characteristic-related criterion, or a business-entity-related criterion comprises:
   receiving the set of data provider criteria including an affinity-related criterion, the affinity-related criterion including at least one of a sports affinity criterion, a religious affinity criterion, a music affinity criterion, a literature affinity criterion, a theater affinity criterion, a film affinity criterion, a television program affinity criterion, a hobby affinity criterion, a service affinity criterion, or a product affinity criterion.

4. The computer-implemented method of claim 2, wherein receiving the set of data provider criteria including at least one of an affinity-related criterion, a health-related criterion, a consumer-related criterion, a personal-characteristic-related criterion, or a business-entity-related criterion comprises:
   receiving the set of data provider criteria including a health-related criterion, the health-related criterion including at least one of an ailment-related criterion, a condition-related criterion, a disease-related criterion, a treatment-related criterion, a prevention-related criterion, a diet-related criterion, an exercise-related criterion, a mental-health related criterion, or a wellness-related criterion.

5. The computer-implemented method of claim 2, wherein receiving the set of data provider criteria including at least one of an affinity-related criterion, a health-related criterion, a consumer-related criterion, a personal-characteristic-related criterion, or a business-entity-related criterion comprises:
   receiving the set of data provider criteria including a consumer-related criterion, the consumer-related criterion including at least one of a purchasing-related criterion, a spending-related criterion, an income-related criterion, a credit-worthiness-related criterion, a subscription-related criterion, an ordering-related criterion, a shopping-related criterion, a browsing-related criterion, a credit card-related criterion, a debit card-related criterion, a check writing-related criterion, a delivery-related criterion, a coupon-related criterion, a selling-method-related criterion, an offering-related criterion, a promotional-event-related criterion, or an advertising-related criterion.

6. The computer-implemented method of claim 2, wherein receiving the set of data provider criteria including at least one of an affinity-related criterion, a health-related criterion, a consumer-related criterion, a personal-characteristic-related criterion, or a business-entity-related criterion comprises:

receiving the set of data provider criteria including a personal-characteristic-related criterion, the personal-characteristic-related criterion including at least one of an age-related criterion, a gender-related criterion, a race-related criterion, an income-related criterion, a geographic location-related criterion, a marital status-related criterion, an education-related criterion, an employment-related criterion, a sexual orientation-related criterion, a cultural-related criterion, a personality characteristic-related criterion, or a demographic-related criterion.

7. The computer-implemented method of claim 2, wherein receiving the set of data provider criteria including at least one of an affinity-related criterion, a health-related criterion, a consumer-related criterion, a personal-characteristic-related criterion, or a business-entity-related criterion comprises:

receiving the set of data provider criteria including a business-entity-related criterion, the business-entity-related criterion including at least one of an employment-related activity, a management-related activity, a marketing-related activity, a sales-related activity, a plan-related activity, a profit-related activity, a loss-related activity, an asset-related activity, a liability-related activity, an inventory-related activity, or an overhead-related activity.

8. The computer-implemented method of claim 1, wherein selecting the data provider from among one or more data providers that satisfy the set of data provider criteria comprises:

searching for the one or more data providers that satisfy the set of data provider criteria;
locating the one or more data providers that satisfy the set of data provider criteria; and
selecting the data provider from among the located one or more data providers.

9. The computer-implemented method of claim 1, wherein selecting the data provider from among one or more data providers that satisfy the set of data provider criteria comprises:

selecting the data provider from among the one or more data providers that are confirmed to satisfy all aspects of the set of data provider criteria.

10. The computer-implemented method of claim 1, wherein selecting the data provider from among one or more data providers that satisfy the set of data provider criteria comprises:

selecting the data provider from among the one or more data providers that are confirmed to satisfy some aspects of the set of data provider criteria, and are presumed to satisfy other aspects of the set of data provider criteria.

11. The computer-implemented method of claim 1, wherein selecting the data provider from among one or more data providers that satisfy the set of data provider criteria comprises:

selecting the data provider from among the one or more data providers that are presumed to satisfy the set of data provider criteria.

12. The computer-implemented method of claim 1, wherein facilitating a compensation arrangement between a data provider and a data consumer regarding one or more data-provider-related search activities comprises:

arranging for compensation to be received from the data consumer in exchange for data gathering related to the data provider.

13. The computer-implemented method of claim 12, wherein arranging for compensation to be received from the data consumer in exchange for data gathering related to the data provider comprises:

arranging for the compensation to be received from the data consumer in exchange for data gathering related to at least one networking device associated with the data provider.

14. The computer-implemented method of claim 12, wherein arranging for compensation to be received from the data consumer in exchange for data gathering related to the data provider comprises:

arranging for the compensation to be received from the data consumer in exchange for data gathering related to at least one computing device associated with the data provider.

15. The computer-implemented method of claim 12, wherein arranging for compensation to be received from the data consumer in exchange for data gathering related to the data provider comprises:

arranging for the compensation to be received from the data consumer in exchange for data gathering related to at least one personal communications device associated with the data provider.

16. The computer-implemented method of claim 12, wherein arranging for compensation to be received from the data consumer in exchange for data gathering related to the data provider comprises:

arranging for a first level of compensation to be received from the data consumer in exchange for data gathering related to a first type of information associated with the data provider; and
arranging for a second level of compensation to be received from the data consumer in exchange for data gathering related to a second type of information associated with the data provider, the second level of compensation being different than the first level of compensation.

17. The computer-implemented method of claim 12, wherein arranging for compensation to be received from the data consumer in exchange for data gathering related to the data provider comprises:

arranging for a plurality of compensation levels to be received from the data consumer in exchange for data gathering related to different types of information associated with the data provider.

18. The computer-implemented method of claim 17, wherein arranging for a plurality of compensation levels to be received from the data consumer in exchange for data gathering related to different types of information associated with the data provider comprises:

arranging for the plurality of compensation levels to be received from the data consumer in exchange for data gathering related to at least one of an affinity-related information, a health-related information, a consumer-related information, a personal-characteristic-related information, or a business-entity-related information.

19. The computer-implemented method of claim 12, wherein arranging for compensation to be received from the data consumer in exchange for data gathering related to the data provider comprises:

arranging for varying levels of compensation to be received from the data consumer in exchange for varying amounts of data gathering associated with the data provider.

20. The computer-implemented method of claim 12, wherein arranging for compensation to be received from the data consumer in exchange for data gathering related to the data provider comprises:
arranging for different levels of compensation to be received from the data consumer in exchange for different fields of use associated with the data gathering.

21. The computer-implemented method of claim 12, wherein arranging for compensation to be received from the data consumer in exchange for data gathering related to the data provider comprises:
arranging for different levels of compensation to be received from the data consumer based on a time value of information provided by the data gathering.

22. The computer-implemented method of claim 21, wherein arranging for different levels of compensation to be received from the data consumer based on a time value of information provided by the data gathering comprises:
arranging for a first level of compensation to be received from the data consumer at least one of associated with or during a first time period of data gathering; and
arranging for a second level of compensation to be received from the data consumer at least one of associated with or during a second time period of data gathering.

23. The computer-implemented method of claim 12, wherein arranging for compensation to be received from the data consumer in exchange for data gathering related to the data provider comprises:
arranging for the compensation to be received from the data consumer based on an incremental change in value of a data consumer's revenue based on the information provided by the data gathering to the data consumer.

24. The computer-implemented method of claim 12, wherein arranging for compensation to be received from the data consumer in exchange for data gathering related to the data provider comprises:
arranging for the compensation to be received from the data consumer based on an indicator of incremental change in value of a data consumer's revenue based on the data consumer's presumed use of a data product by the data consumer.

25. The computer-implemented method of claim 12, wherein arranging for compensation to be received from the data consumer in exchange for data gathering related to the data provider comprises:
arranging for the compensation to be received from the data consumer in exchange for data gathering related to information presumed to have been eyeballed by the data provider.

26. The computer-implemented method of claim 25, wherein arranging for compensation to be received from the data consumer in exchange for data gathering related to information presumed to have been eyeballed by the data provider comprises:
arranging for the compensation to be received from the data consumer in exchange for data gathering related to an amount of time presumed to have been spent eyeballing the information by the data provider.

27. The computer-implemented method of claim 25, wherein arranging for the compensation to be received from the data consumer in exchange for data gathering related to information presumed to have been eyeballed by the data provider comprises:
arranging for the compensation to be received from the data consumer in exchange for data gathering related to a quantity of data presumed to have been eyeballed by the data provider.

28. The computer-implemented method of claim 1, further comprising:
providing a data product to the data consumer in accordance with the compensation arrangement.

29. The computer-implemented method of claim 1, further comprising:
monitoring a performance of the data consumer.

30. The computer-implemented method of claim 1, further comprising:
receiving compensation from the data consumer in accordance with the compensation arrangement.

31. The computer-implemented method of claim 1, further comprising:
compensating the data provider in accordance with the compensation arrangement.

32. The computer-implemented method of claim 1, wherein arranging for compensation to be received from the data consumer in exchange for access to at least one or more data provider-related search activities comprises:
arranging for compensation to be received from the data consumer in exchange for access to the at least one or more data provider-related search activities, wherein the data provider-related search activities is an individual's online search terms.

33. The computer-implemented method of claim 1, wherein arranging for compensation to be received from the data consumer in exchange for access to at least one or more data provider-related search activities comprises:
arranging for compensation to be received from the data consumer in exchange for access to the at least one or more data provider-related search activities, wherein the data provider-related search activities is the browsing histories of an association member.

34. The computer-implemented method of claim 1, wherein arranging for compensation to be received from the data consumer in exchange for access to at least one or more data provider-related search activities, wherein access to the at least one or more data provider-related search activities includes access to a data counter of data from the at least one or more data provider-related search activities comprises:
arranging for compensation to be received from the data consumer in exchange for access to the at least one or more data provider-related search activities, wherein access to the at least one or more data provider-related search activities includes access to the data counter of the data from the at least one or more data provider-related search activities, wherein access to the data counter of the at least one or more data provider-related search activities includes access to a data meter that captures the upload of the at least one or more data provider-related search activities.

35. The computer-implemented method of claim 1, wherein arranging for compensation to be received from the data consumer in exchange for access to at least one or more data provider-related search activities, wherein access to the at least one or more data provider-related search activities includes access to a data counter of data from the at least one or more data provider-related search activities comprises:
arranging for compensation to be received from the data consumer in exchange for access to the at least one or more data provider-related search activities, wherein access to the at least one or more data provider-related search activities includes access to the data counter of the data from the at least one or more data provider-related search activities, wherein access to the data counter of the at least one or more data provider-related search activities includes access to a data meter that captures the download of the at least one or more data provider-related search activities.

36. A non-transitory signal-bearing medium bearing one or more instructions that, when executed by an executing component, perform a method comprising:
  facilitating a compensation arrangement between a data provider and a data consumer regarding one or more data-provider-related search activities, comprising:
  a) receiving a set of data provider criteria from the data consumer;
  b) selecting the data provider from among one or more data providers that satisfy the set of data provider criteria;
  c) arranging for compensation to be received from the data consumer in exchange for access to at least one or more data provider-related search activities, wherein access to the at least one or more data provider-related search activities includes access to a data counter of data from the at least one or more data provider-related search activities; and
  d) perform an analysis to determine a potential value of the data, wherein the potential value includes a time value of the data, wherein the time value is at least partially based on when the data was acquired.

37. A system, comprising:
an executing component;
a memory operatively coupled to the executing component; and
a brokering component at least partially residing within the memory and accessible by the executing component, the brokering component being operable to facilitate a compensation arrangement between a data provider and a data consumer regarding one or more data-provider-related search activities, the brokering component being further operable to:
  a) receive a set of data provider criteria from the data consumer;
  b) select the data provider from among one or more data providers that satisfy the set of data provider criteria; and
  c) arrange for compensation to be received from the data consumer in exchange for access to at least one or more data provider-related search activities, wherein access to the at least one or more data provider-related search activities includes access to a data counter of data from the at least one or more data provider-related search activities; and
  d) perform an analysis to determine a potential value of the data, wherein the potential value includes a time value of the data, wherein the time value is at least partially based on when the data was acquired;
and wherein at least one of the executing component, the memory, or the brokering component is at least partially implemented using hardware.

38. The system of claim 37, wherein the brokering component operable to receive a set of data provider criteria from the data consumer comprises:
  a component operable to receive the set of data provider criteria including at least one of an affinity-related criterion, a health-related criterion, a consumer-related criterion, a personal-characteristic-related criterion, or a business-entity-related criterion 39. The system of claim 38, wherein a component operable to receive the set of data provider criteria including at least one of an affinity-related criterion, a health-related criterion, a consumer-related criterion, a personal-characteristic-related criterion, or a business-entity-related criterion comprises:
  one or more components operable to receive the set of data provider criteria including the affinity-related criterion, the affinity-related criterion including at least one of a sports affinity criterion, a religious affinity criterion, a music affinity criterion, a literature affinity criterion, a theater affinity criterion, a film affinity criterion, a television program affinity criterion, a hobby affinity criterion, a service affinity criterion, or a product affinity criterion 40. The system of claim 38, wherein a component operable to receive the set of data provider criteria including at least one of an affinity-related criterion, a health-related criterion, a consumer-related criterion, a personal-characteristic-related criterion, or a business-entity-related criterion comprises:
  one or more components operable to receive the set of data provider criteria including the health-related criterion, the health-related criterion including at least one of an ailment-related criterion, a condition-related criterion, a disease-related criterion, a treatment-related criterion, a prevention-related criterion, a diet-related criterion, an exercise-related criterion, a mental-health related criterion, or a wellness-related criterion.

41. The system of claim 38, wherein a component operable to receive the set of data provider criteria including at least one of an affinity-related criterion, a health-related criterion, a consumer-related criterion, a personal-characteristic-related criterion, or a business-entity-related criterion comprises:
  one or more components operable to receive the set of data provider criteria including the consumer-related criterion, the consumer-related criterion including at least one of a purchasing-related criterion, a spending-related criterion, an income-related criterion, a credit-worthiness-related criterion, a subscription-related criterion, an ordering-related criterion, a shopping-related criterion, a browsing-related criterion, a credit card-related criterion, a debit card-related criterion, a check writing-related criterion, a delivery-related criterion, a coupon-related criterion, a selling-method-related criterion, an offering-related criterion, a promotional-event-related criterion, or an advertising-related criterion.

42. The system of claim 38, wherein a component operable to receive the set of data provider criteria including at least one of an affinity-related criterion, a health-related criterion, a consumer-related criterion, a personal-characteristic-related criterion, or a business-entity-related criterion comprises:
  one or more components operable to receive the set of data provider criteria including the personal-characteristic-related criterion, the personal-characteristic-related criterion including at least one of an age-related criterion, a gender-related criterion, a race-related criterion, an income-related criterion, a geographic location-related criterion, a marital status-related criterion, an education-related criterion, an employment-related criterion, a sexual orientation-related criterion, a cultural-related criterion, a personality characteristic-related criterion, or a demographic-related criterion.

43. The system of claim 38, wherein a component operable to receive the set of data provider criteria including at least one of an affinity-related criterion, a health-related criterion, a consumer-related criterion, a personal-characteristic-related criterion, or a business-entity-related criterion comprises:

one or more components operable to receive the set of data provider criteria including the business-entity-related criterion, the business-entity-related criterion including at least one of an employment-related activity, a management-related activity, a marketing-related activity, a sales-related activity, a plan-related activity, a profit-related activity, a loss-related activity, an asset-related activity, a liability-related activity, an inventory-related activity, or an overhead-related activity.

44. The system of claim 37, wherein the brokering component operable to select the data provider from among one or more data providers that satisfy the set of data provider criteria comprises:

one or more components operable to receive the one or more data providers that satisfy the set of data provider criteria;
one or more components operable to locate the one or more data providers that satisfy the set of data provider criteria; and
one or more components operable to select the data provider from among the located one or more data providers.

45. The system of claim 37, wherein the brokering component operable to select the data provider from among one or more data providers that satisfy the set of data provider criteria comprises:

one or more components operable to select the data provider from among the one or more data providers that are confirmed to satisfy all aspects of the set of data provider criteria.

46. The system of claim 37, wherein the brokering component operable to select the data provider from among one or more data providers that satisfy the set of data provider criteria comprises:

one or more components operable to select the data provider from among the one or more data providers that are confirmed to satisfy some aspects of the set of data provider criteria, and are presumed to satisfy other aspects of the set of data provider criteria.

47. The system of claim 37, wherein the brokering component operable to select the data provider from among one or more data providers that satisfy the set of data provider criteria comprises:

one or more components operable to select the data provider from among the one or more data providers that are presumed to satisfy the set of data provider criteria.

48. The system of claim 37, wherein the brokering component operable to select the data provider from among one or more data providers that satisfy the set of data provider criteria comprises:

one or more components operable to arrange for compensation to be received from the data consumer in exchange for data gathering related to the data provider.

49. The system of claim 48, wherein one or more components operable to arrange for compensation to be received from the data consumer in exchange for data gathering related to the data provider comprises:

one or more components operable to arrange for compensation to be received from the data consumer in exchange for data gathering related to at least one networking device associated with the data provider.

50. The system of claim 48, wherein one or more components operable to arrange for compensation to be received from the data consumer in exchange for data gathering related to the data provider comprises:

one or more components operable to arrange for compensation to be received from the data consumer in exchange for data gathering related to at least one computing device associated with the data provider.

51. The system of claim 48, wherein one or more components operable to arrange for compensation to be received from the data consumer in exchange for data gathering related to the data provider comprises:

one or more components operable to arrange for compensation to be received from the data consumer in exchange for data gathering related to at least one personal communications device associated with the data provider.

52. The system of claim 48, wherein one or more components operable to arrange for compensation to be received from the data consumer in exchange for data gathering related to the data provider comprises:

one or more components operable to arrange for a first level of compensation to be received from the data consumer in exchange for data gathering related to a first type of information associated with the data provider; and
one or more components operable to arrange for a second level of compensation to be received from the data consumer in exchange for data gathering related to a second type of information associated with the data provider, the second level of compensation being different than the first level of compensation.

53. The system of claim 48, wherein one or more components operable to arrange for compensation to be received from the data consumer in exchange for data gathering related to the data provider comprises:

one or more components operable to arrange for a plurality of compensation levels to be received from the data consumer in exchange for data gathering related to different types of information associated with the data provider.

54. The system of claim 48, wherein one or more components operable to arrange for compensation to be received from the data consumer in exchange for data gathering related to the data provider comprises:

one or more components operable to arrange for varying levels of compensation to be received from the data consumer in exchange for varying amounts of data gathering associated with the data provider.

55. The system of claim 48, wherein one or more components operable to arrange for compensation to be received from the data consumer in exchange for data gathering related to the data provider comprises:

one or more components operable to arrange for different levels of compensation to be received from the data consumer based on a time value of information provided by the data gathering.

56. The system of claim 48, wherein one or more components operable to arrange for compensation to be received from the data consumer in exchange for data gathering related to the data provider comprises:

one or more components operable to arrange for a first level of compensation to be received from the data consumer at least one of associated with or during a first time period of data gathering; and
one or more components operable to arrange for a second level of compensation to be received from the data consumer at least one of associated with or during a second time period of data gathering.

57. The system of claim 48, wherein one or more components operable to arrange for compensation to be received from the data consumer in exchange for data gathering related to the data provider comprises:
    one or more components operable to arrange for compensation to be received from the data consumer based on an incremental change in value of a data consumer's revenue based on the value of the information provided by the data gathering to the data consumer.

58. The system of claim 48, wherein one or more components operable to arrange for compensation to be received from the data consumer in exchange for data gathering related to the data provider comprises:
    one or more components operable to arrange for compensation to be received from the data consumer in exchange for data gathering related to information presumed to have been eyeballed by the data provider.

59. The system of claim 37, further comprising:
    at least one component operable to receive compensation from the data consumer in accordance with the compensation arrangement.

60. The system of claim 37, further comprising:
    at least one component operable to compensate the data provider in accordance with the compensation arrangement.

* * * * *

UNITED STATES PATENT AND TRADEMARK OFFICE
CERTIFICATE OF CORRECTION

PATENT NO. : 8,473,387 B2  
APPLICATION NO. : 12/221203  
DATED : June 25, 2013  
INVENTOR(S) : Flake et al.

Page 1 of 1

It is certified that error appears in the above-identified patent and that said Letters Patent is hereby corrected as shown below:

In the Claims

In Column 29, Line 42, Claim 37 please delete text "and"

Signed and Sealed this
Twenty-fourth Day of September, 2013

Teresa Stanek Rea
*Deputy Director of the United States Patent and Trademark Office*